United States Patent
Nose

(10) Patent No.: US 7,720,369 B2
(45) Date of Patent: May 18, 2010

(54) IMAGE TAKING APPARATUS

(75) Inventor: Syuji Nose, Asaka (JP)

(73) Assignee: Fujifilm Corporation, Tokyo (JP)

( * ) Notice: Subject to any disclaimer, the term of this patent is extended or adjusted under 35 U.S.C. 154(b) by 51 days.

(21) Appl. No.: 12/036,379

(22) Filed: Feb. 25, 2008

(65) Prior Publication Data

US 2008/0205869 A1    Aug. 28, 2008

(30) Foreign Application Priority Data

Feb. 26, 2007    (JP)    ............... 2007-045827

(51) Int. Cl.
G03B 17/00 (2006.01)
G03B 3/00 (2006.01)
G03B 13/00 (2006.01)
H04N 5/262 (2006.01)
G06K 9/36 (2006.01)

(52) U.S. Cl. ............... 396/77; 396/124; 396/125; 348/240.99; 382/118; 382/291

(58) Field of Classification Search .............. 396/77
See application file for complete search history.

(56) References Cited

U.S. PATENT DOCUMENTS

| | | | |
|---|---|---|---|
| 5,355,163 A | 10/1994 | Tomitaka et al. | 348/234 |
| 5,812,193 A | 9/1998 | Tomitaka et al. | 348/369 |
| 5,835,641 A * | 11/1998 | Sotoda et al. | 382/291 |
| 7,515,739 B2 * | 4/2009 | Porter et al. | 382/118 |
| 2004/0207743 A1* | 10/2004 | Nozaki et al. | 348/333.12 |
| 2007/0110321 A1* | 5/2007 | Okada et al. | 382/209 |
| 2007/0268394 A1* | 11/2007 | Nonaka et al. | 348/333.12 |

FOREIGN PATENT DOCUMENTS

| | | |
|---|---|---|
| EP | 1471455 A2 | 10/2004 |
| JP | 6-153047 A | 5/1994 |
| JP | 6-217187 A | 8/1994 |
| JP | 11-84481 A | 3/1999 |
| JP | 2004-320286 A | 11/2004 |

OTHER PUBLICATIONS

English Machine Translation of Nishida et al. JP6217187, Aug. 5, 1994, 64 pages. Cited on IDS of Feb. 25, 2008.*

* cited by examiner

*Primary Examiner*—Melissa J Koval
(74) *Attorney, Agent, or Firm*—Birch, Stewart, Kolach & Birch, LLP

(57) ABSTRACT

According to an aspect of the present invention, once the mode setting device sets the person photographing mode, and the face zooming instruction device instructs zooming to the face of the person, the detection device detects the size of the face of the person captured by the image pickup device. The zooming device is then controlled so as to capture the face of the person in a certain size based on the detection result. Subsequently, the photographer instructs zooming in the telephoto direction or the wide direction using the zooming instruction device as necessary to thereby allow fine adjustment of the composition. This enables to easily and quickly photograph an image in a user's desired composition.

7 Claims, 21 Drawing Sheets

FIG.14A
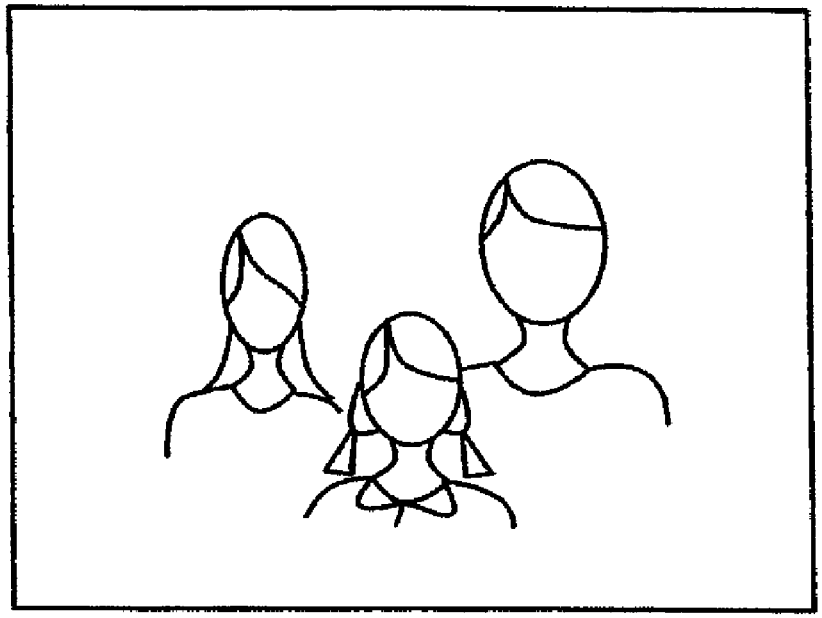
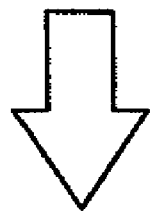
FIG.14B
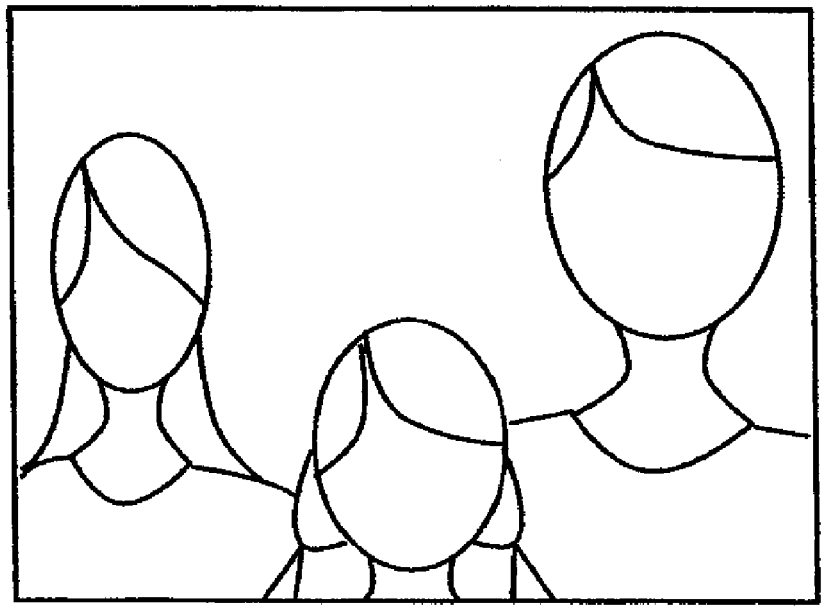

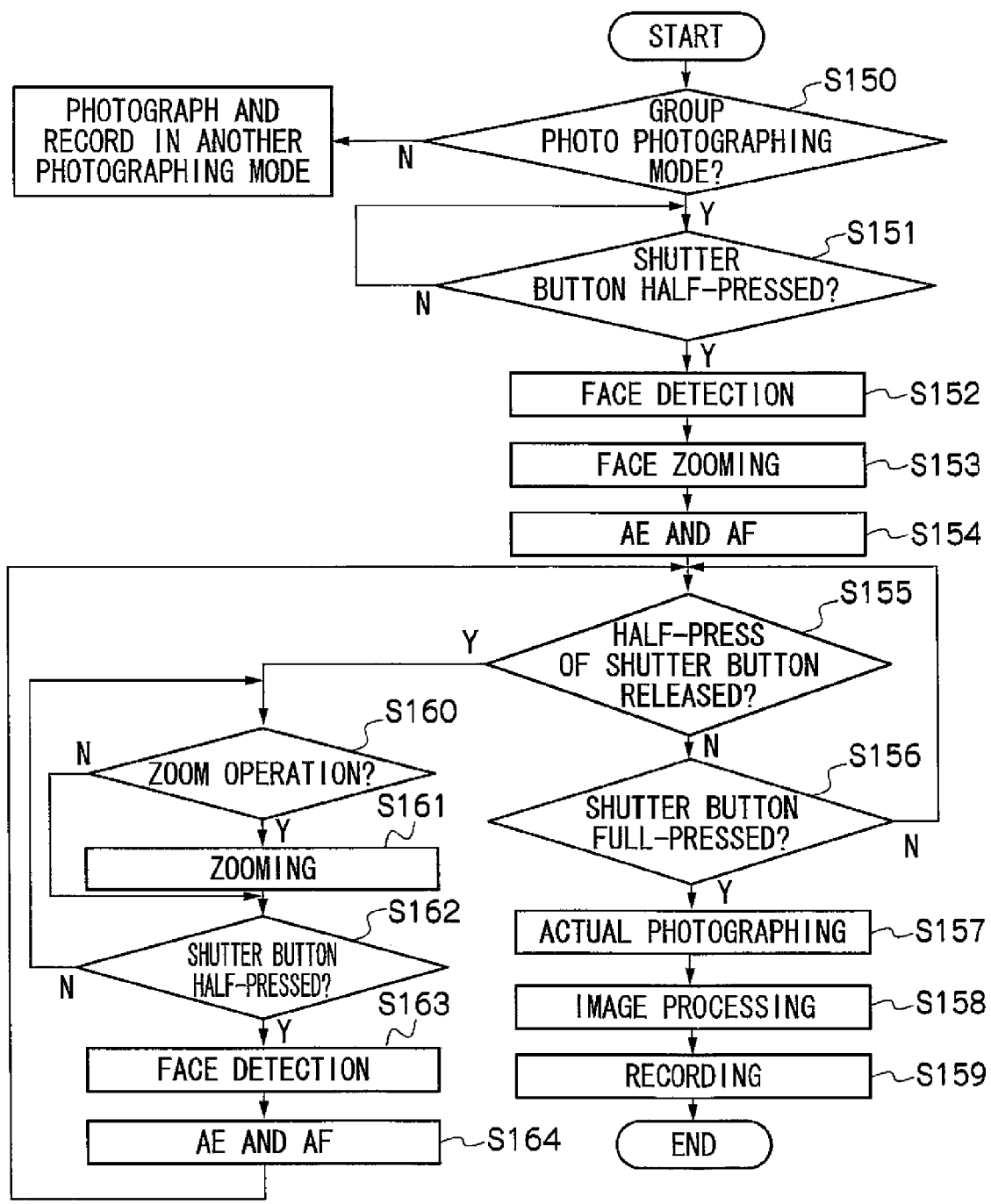

FOR TWO PERSONS 1

FOR TWO PERSONS 2

FOR THREE PERSONS 1

FOR THREE PERSONS 2

FOR FOUR PERSONS 1

FOR FOUR PERSONS 2

CROPPING

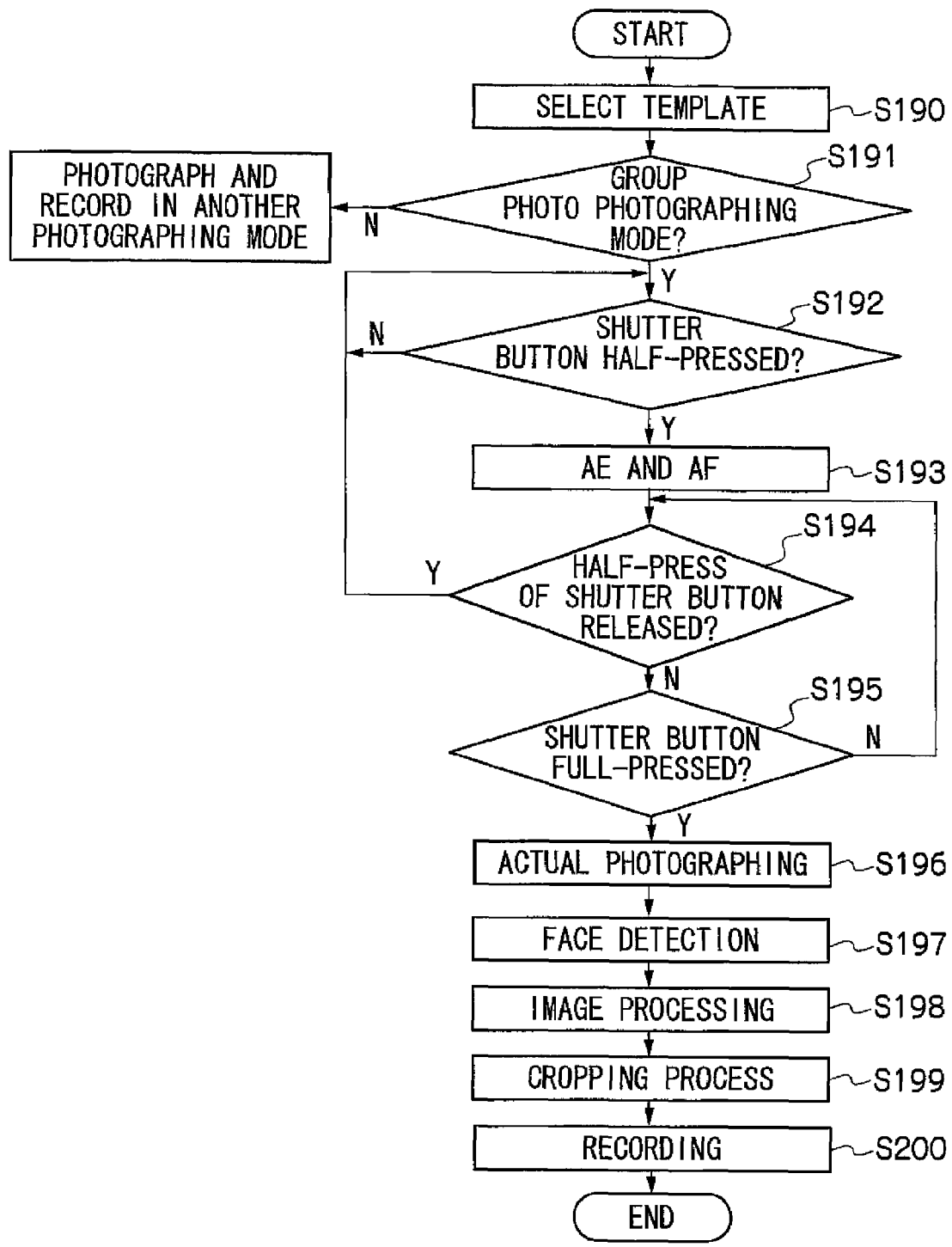

IMAGE TAKING APPARATUS

BACKGROUND OF THE INVENTION

1. Field of the Invention

The present invention relates to an image taking apparatus, and more particularly to an image taking apparatus with a zoom function.

2. Description of the Related Art

When photographing a person as an object, such as in the portrait photographing, the composition is usually adjusted so that the person is photographed in a proper size.

The composition is usually adjusted using a zoom function in a camera having a zoom function. However, an opportunity to press the shutter may be missed during the zooming operation.

Under the circumstances, Japanese Patent Application Laid-Open Nos. 6-217187, 2004-320286, and 6-153047 propose technologies for automatic zooming when photographing moving images of a person. The face of a person is identified from the photographed images, and the size and the position of the face is found such that the face of the person is always photographed in a certain size.

Japanese Patent Application Laid-Open No. 11-84481 proposes a technique for obtaining an image with a proper face size when photographing an ID photo. The size of the face of an object is detected from the photographed image, and the image is automatically contracted or expanded such that the size of the detected face becomes a standard size.

SUMMARY OF THE INVENTION

However, the conventional automatic zooming techniques have drawbacks that the photographer is unable to photograph an image in a truly intended composition because the photograph is taken in which the size of the face of a person is always constant. In other words, the techniques have drawbacks that an image cannot be captured in a composition according to the photographing scene or the preference of the photographer because the face of the person is always photographed in a certain size.

The present invention has been made in view of the foregoing, and an object thereof is to provide an image taking apparatus capable of easily and quickly photographing an image in a user's desired composition.

To attain the object, a first aspect of the present invention provides an image taking apparatus which records an image captured by an image pickup device in a recording medium in response to an image recording instruction, the image taking apparatus comprising: a zooming device; a zooming instruction device which instructs zooming by the zooming device in a telephoto direction or a wide angle direction; a mode setting device which sets a person photographing mode; a detection device which detects a size of a face of a person captured by the image pickup device in the person photographing mode; a face zooming instruction device which instructs zooming of the face of the person by the zooming device in the person photographing mode; and a control device which controls the zooming device in response to an instruction from the zooming instruction device and which controls the zooming device such that the size of the face of the person captured by the image pickup device becomes a certain size based on the detection result of the detection device when zooming to the face of the person is instructed from the face zooming instruction device in the person photographing mode.

According to the first aspect of the present invention, once the mode setting device sets the person photographing mode, and the face zooming instruction device instructs zooming to the face of the person, the detection device detects the size of the face of the person captured by the image pickup device. The zooming device is then controlled so as to capture the face of the person in a certain size based on the detection result. Subsequently, the photographer instructs zooming in the telephoto direction or the wide direction using the zooming instruction device as necessary to thereby allow fine adjustment of the composition. This enables to easily and quickly photograph an image in a user's desired composition.

To attain the object, a second aspect of the present invention provides the image taking apparatus according to the first aspect, further comprising a setting device which sets the size of the face of the person to be photographed by the image pickup device, wherein the control device controls the zooming device such that the size of the face of the person captured by the image pickup device becomes the size set by the setting device.

According to the second aspect of the present invention, the user can arbitrarily set the size of the face of the person zoomed in response to an instruction of face zooming. This enables to more easily and quickly photograph an image of a person in a desired composition.

To attain the object, a third aspect of the present invention provides the image taking apparatus according to the first aspect, further comprising: a second detection device which detects the size of the face of the person captured by the image pickup device in the person photographing mode; and an estimation device which estimates the size of the face of the person high in the photographing frequency based on the detection result of the second detection device, wherein the control device controls the zooming device such that the size of the face of the person captured by the image pickup device becomes the size estimated by the estimation device.

According to the third aspect of the present invention, the tendency of the composition set by the user is learned. More specifically, once a photograph is taken in the person photographing mode, the size of the face of the person photographed is detected, and the tendency of the size of the face set by the user is estimated based on the detection result. In the next photographing, the zooming is controlled to obtain the estimated face size when the face zooming is instructed. This enables to more quickly photograph an image of a person in the user's desired composition.

To attain the object, a fourth aspect of the present invention provides an image taking apparatus which records an image captured by an image pickup device in a recording medium in response to an image recording instruction, the image taking apparatus comprising: a zooming device; a zooming instruction device which instructs zooming by the zooming device in a telephoto direction or a wide angle direction; a mode setting device which sets a group photographing mode; a detection device which detects positions and sizes of faces of persons captured by the image pickup device in the group photographing mode; a face zooming instruction device which instructs zooming to the faces of the persons by the zooming device in the group photographing mode; and a control device which controls the zooming device in response to an instruction from the zooming instruction device and which controls the zooming device such that the faces of the persons captured by the image pickup device are shown full screen based on the detection result of the detection device when zooming to the faces of the persons is instructed from the face zooming instruction device in the group photographing mode.

According to the fourth aspect of the present invention, once the mode setting device sets the group photographing mode, and the face zooming instruction device instructs zooming to the faces of the persons, the detection device detects the positions and the sizes of the faces of the persons captured by the image pickup device. The zooming device is controlled based on the detection result such that the faces of the persons captured by the image pickup device are shown full screen. Subsequently, the photographer instructs zooming in the telephoto direction or the wide direction using the zooming instruction device as necessary to thereby allow fine adjustment of the composition. This enables to easily and quickly photograph a group photo in a desired composition.

To attain the object, a fifth aspect of the present invention provides an image taking apparatus which records an image captured by an image pickup device in a recording medium in response to an image recording instruction, the image taking apparatus comprising: a zooming device; a zooming instruction device which instructs zooming by the zooming device in a telephoto direction or a wide angle direction; a mode setting device which sets a person photographing mode; a template recording device which is recorded with a plurality of person photographing templates with different sizes of faces; a selection device which selects a template for use in the person photographing mode; a detection device which detects a size of a face of a person captured by the image pickup device in the person photographing mode; a face zooming instruction device which instructs zooming of the face of the person by the zooming device in the person photographing mode; and a control device which controls the zooming device in response to an instruction from the zooming instruction device and which controls the zooming device such that the size of the face of the person captured by the image pickup device becomes the same as the size of the face of the person in the template selected by the selection device based on the detection result of the detection device when zooming to the face of the person is instructed by the face zooming instruction device in the person photographing mode.

According to the fifth aspect of the present invention, once the mode setting device sets the person photographing mode, and the selection device selects a template, while the face zooming instruction device instructs zooming to the face of the person, the detection device detects the size of the face of the person captured by the image pickup device. The zooming device is then controlled based on the detection result such that the size of the face of the person captured by the image pickup device becomes the same as the size of the face of the person in the template selected by the selection device. Subsequently, the photographer instructs zooming in the telephoto direction or the wide direction using the zooming instruction device as necessary to thereby allow fine adjustment of the composition. This enables to easily and quickly photograph an image of a person in a desired composition.

To attain the object, a sixth aspect of the present invention provides an image taking apparatus which records an image captured by an image pickup device in a recording medium in response to an image recording instruction, the image taking apparatus comprising: a zooming device; a zooming instruction device which instructs zooming by the zooming device in a telephoto direction or a wide angle direction; a mode setting device which sets a person photographing mode; a template recording device which is recorded with a person photographing template for use in the person photographing mode; a setting device which sets a size of a face of a person in the template; a detection device which detects a size of a face of a person captured by the image pickup device in the person photographing mode; a face zooming instruction device which instructs zooming of the face of the person by the zooming device in the person photographing mode; and a control device which controls the zooming device in response to an instruction from the zooming instruction device and which controls the zooming device such that the size of the face of the person captured by the image pickup device becomes the same as the set size of the face of the person in the template based on the detection result of the detection device when zooming to the face of the person is instructed by the face zooming instruction device in the person photographing mode.

According to the sixth aspect of the present invention, once the mode setting device sets the person photographing mode, and the face zooming instruction device instructs zooming to the face of the person, the detection device detects the size of the face of the person captured by the image pickup device. The zooming device is then controlled based on the detection result such that the size of the face of the person captured by the image pickup device becomes the same as the size of the face of the person in the template. The size of the face of the person in the template can be set to an arbitrary size by the setting device. This enables to more easily and quickly photograph an image of a person in a desired composition.

To attain the object, a seventh aspect of the present invention provides an image taking apparatus which records an image captured by an image pickup device in a recording medium in response to an image recording instruction, the image taking apparatus comprising: a zooming device; a zooming instruction device which instructs zooming by the zooming device in a telephoto direction or a wide angle direction; a mode setting device which sets a group photographing mode; a template recording device which is recorded with a plurality of group photographing templates with different distributions of the faces of persons; a selection device which selects a template for use in the group photographing mode; a detection device which detects positions and sizes of faces of persons captured by the image pickup device in the group photographing mode; a face zooming instruction device which instructs zooming of the faces of the persons by the zooming device in the group photographing mode; and a control device which controls the zooming device in response to an instruction from the zooming instruction device and which controls the zooming device such that a distribution of the faces of the persons captured by the image pickup device approaches the distribution of the faces of the persons in the template selected by the selection device based on the detection result of the detection device when zooming to the faces of the persons is instructed by the face zooming instruction device in the group photographing mode.

According to the seventh aspect of the present invention, once the mode setting device sets the group photographing mode, and the selection device selects a template, while the face zooming instruction device instructs zooming to the faces of the persons, the detection device detects the positions and the sizes of the faces of the persons captured by the image pickup device. The zooming device is then controlled based on the detection result such that the distribution of the faces of the persons captured by the image pickup device approaches the distribution of the faces of the persons in the template selected by the selection device. Subsequently, the photographer instructs zooming in the telephoto direction or the wide direction using the zooming instruction device as necessary to thereby allow fine adjustment of the composition. This enables to easily and quickly photograph a group photo in a desired composition.

To attain the object, an eighth aspect of the present invention provides an image taking apparatus which records an image captured by an image pickup device in a recording medium in response to an image recording instruction, the image taking apparatus comprising: a zooming device; a zooming instruction device which instructs zooming by the zooming device in a telephoto direction or a wide angle direction; a mode setting device which sets a group photographing mode; a template recording device which is recorded with a plurality of group photographing templates with different numbers of persons; a selection device which selects a template for use in the group photographing mode; a setting device which sets positions and sizes of faces of persons in the template selected by the selection device; a detection device which detects positions and sizes of faces of persons captured by the image pickup device in the group photographing mode; a face zooming instruction device which instructs zooming of the faces of the persons by the zooming device in the group photographing mode; and a control device which controls the zooming device in response to an instruction from the zooming instruction device and which controls the zooming device such that a distribution of the faces of the persons captured by the image pickup device approaches the distribution of the faces of the persons in the template selected by the selection device based on the detection result of the detection device when zooming to the faces of the persons is instructed by the face zooming instruction device in the group photographing mode.

According to the eighth aspect of the present invention, once the mode setting device sets the group photographing mode, and a template is selected, while the face zooming instruction device instructs zooming to the faces of the persons, the detection device detects positions and sizes of faces of persons captured by the image pickup device. The zooming device is then controlled based on the detection result such that a distribution of the faces of the persons captured by the image pickup device approaches the distribution of the faces of the persons in the template selected by the selection device. The positions and the sizes of the faces of the persons in the template can be arbitrarily set by the setting device. This enables to more easily and quickly photograph a group photo in a desired composition.

To attain the object, a ninth aspect of the present invention provides the image taking apparatus according to any one of the first to eighth aspects, the image taking apparatus comprising a two-step stroke shutter button operable to half-pressing and full-pressing, wherein the half-pressing of the shutter button instructs the zooming device to zoom a face of a person, while the full-pressing of the shutter button instructs recording of an image.

According to the ninth aspect of the present invention, the half-pressing of the shutter button instructs zooming of a face of a person, and the full-pressing instructs recording of an image. This enables to more quickly and easily photograph an image of a person in a desired composition.

To attain the object, a tenth aspect of the present invention provides an image taking apparatus which records an image captured by an image pickup device in a recording medium in response to an image recording instruction, the image taking apparatus comprising: a mode setting device which sets a group photographing mode; a template recording device which is recorded with a plurality of group photographing templates with different distributions of the faces of persons; a selection device which selects a template for use in the group photographing mode; a detection device which detects positions and sizes of faces of persons from an image captured by the image pickup device in the group photographing mode; an image processing device which cuts out an image having a substantially the same composition as a distribution of the faces of the persons in the template selected by the selection device from the image captured by the image pickup device based on the detection result of the detection device in the group photographing mode, wherein the image cut out by the image processing device is recorded in the recording medium in the group photographing mode.

According to the tenth aspect of the present invention, once the mode setting device sets the group photographing mode, selects a template, and takes a picture, the positions and the sizes of the faces of the persons are detected from an image captured by the image pickup device. An image having a substantially the same composition as the distribution of the faces of the persons in the selected template is cut out from the captured image based on the detection result, and the cut out image is recorded in the recording medium as a photographic image. This enables to more easily and quickly photograph a group photo in a desired composition.

To attain the object, an eleventh aspect of the present invention provides an image taking apparatus which records an image captured by an image pickup device in a recording medium in response to an image recording instruction, the image taking apparatus comprising: a mode setting device which sets a group photographing mode; a template recording device which is recorded with a plurality of group photographing templates with different numbers of persons; a selection device which selects a template for use in the group photographing mode; a setting device which sets positions and sizes of faces of persons in the template selected by the selection device; a detection device which detects positions and sizes of faces of persons captured by the image pickup device in the group photographing mode; an image processing device which cuts out an image having a substantially the same composition as a distribution of the faces of the persons in the template selected by the selection device from the image captured by the image pickup device based on the detection result of the detection device in the group photographing mode, wherein the image cut out by the image processing device is recorded in the recording medium in the group photographing mode.

According to the eleventh aspect of the present invention, once the mode setting device sets the group photographing mode, selects a template, and takes a picture, the positions and the sizes of the faces of the persons are detected from an image captured by the image pickup device. An image having a substantially the same composition as the distribution of the faces of the persons in the selected template is cut out from the captured image based on the detection result, and the cut out image is recorded in the recording medium as a photographic image. The positions and the sizes of the faces of the persons in the template can be set to arbitrary positions and sizes by the setting device. This enables to more easily and quickly photograph a group photo in a desired composition.

According to the present invention, an image can be easily and quickly photographed in a user's desired composition.

BRIEF DESCRIPTION OF THE DRAWINGS

FIGS. 14A and 14B are schematic diagrams of the process in a group photo photographing mode;

FIG. 15 is a flow chart of the procedure of operations of photographing and recording by the electronic camera in the group photo photographing mode;

FIG. 21 is a flow chart of the procedure of operations of photographing and recording in the group photo photographing mode of the electronic camera according to the third embodiment.

DETAILED DESCRIPTION OF THE PREFERRED EMBODIMENTS

The preferred embodiments of an image taking apparatus of the present invention will now be described with reference to the accompanying drawings.

Figure 1:
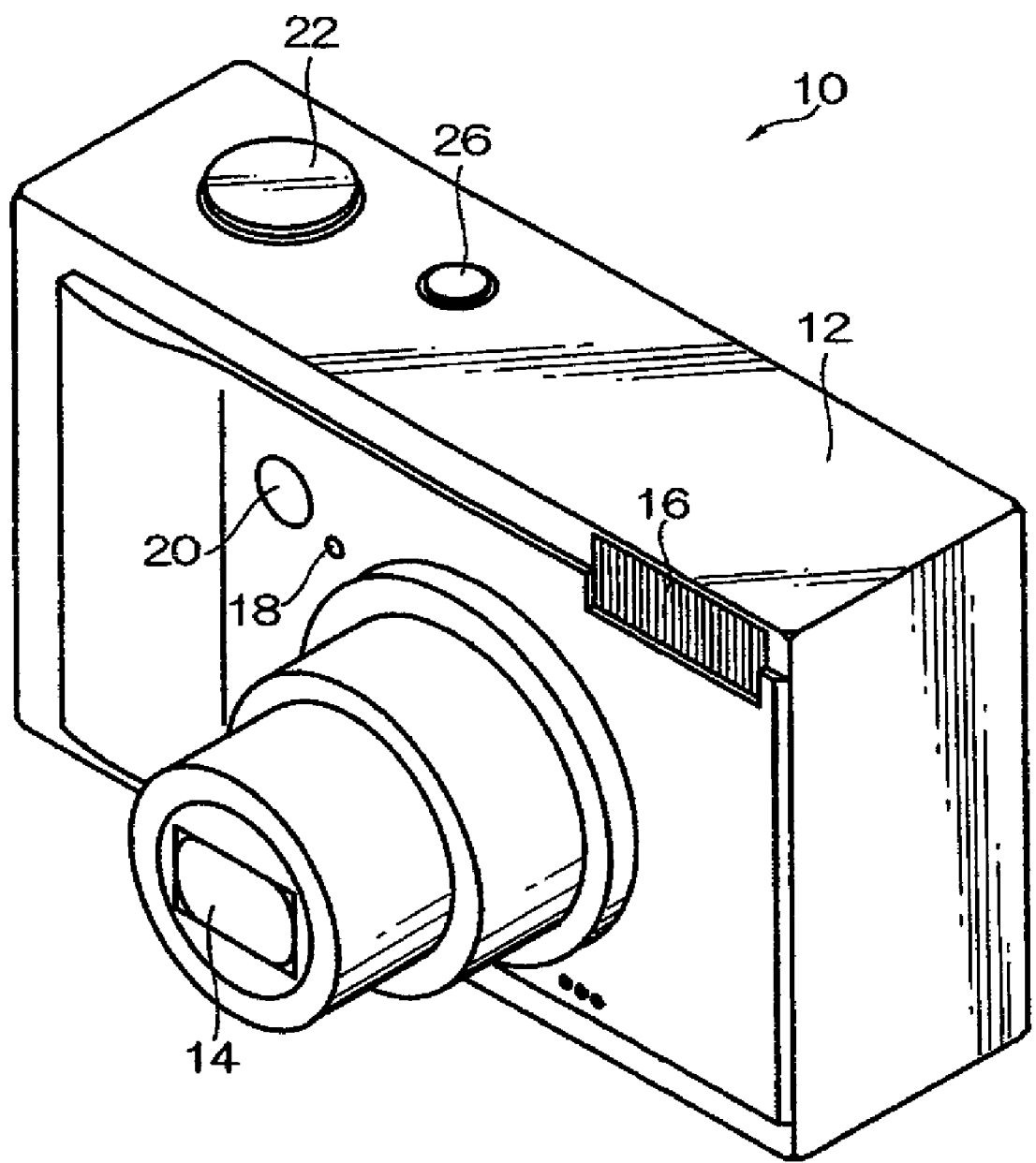
FIG. 1 is a front perspective view of an external configuration of an electronic camera.
Figure 2:
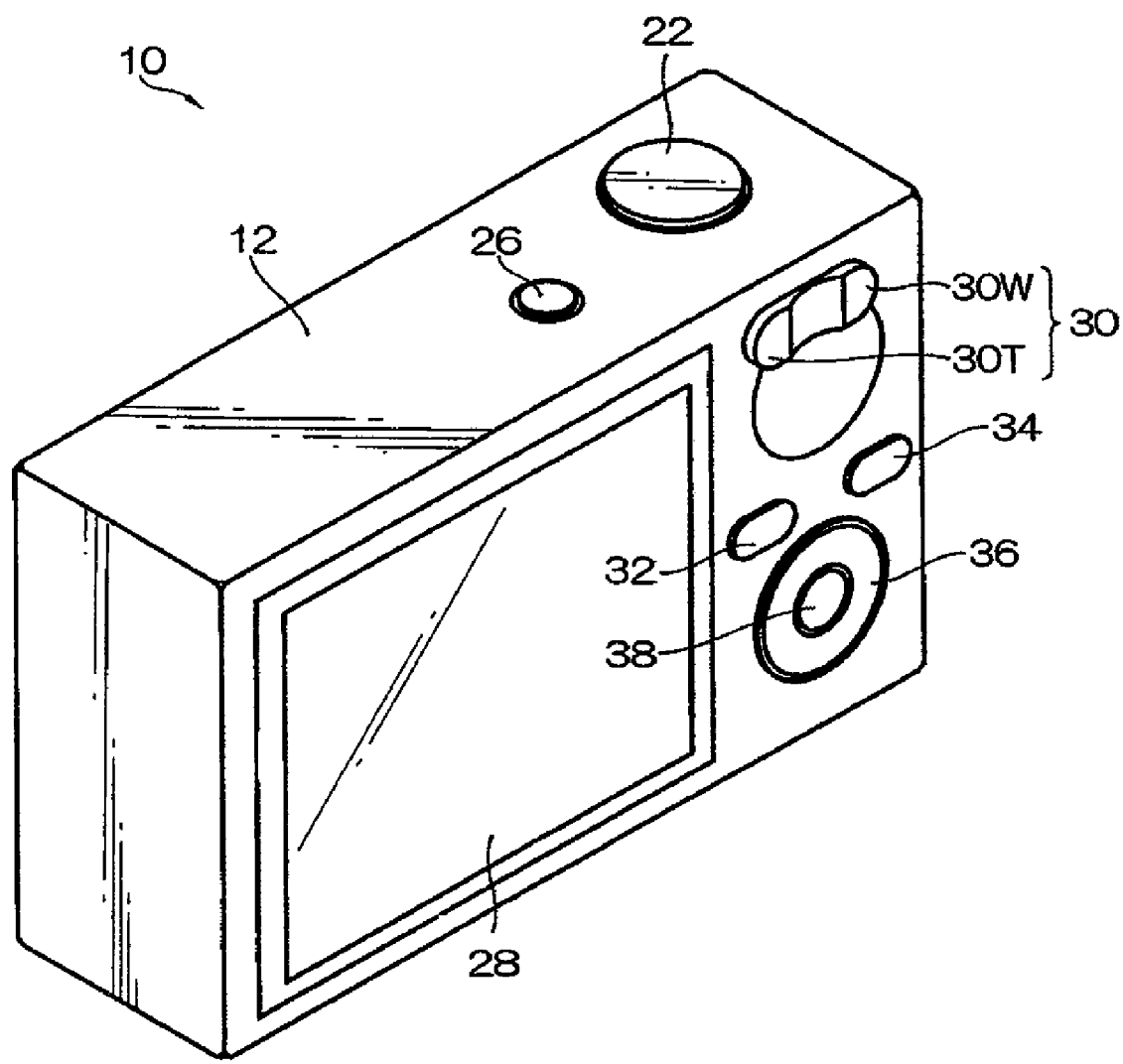
FIG. 2 is a back perspective view of an external configuration of the electronic camera.

FIGS. 1 and 2 are a front perspective view and a back perspective view respectively, showing an external configuration of one embodiment of an electronic camera in which the present invention is applied.

As shown in FIGS. 1 and 27 a camera body 12 of this electronic camera 10 is formed in a thin rectangular box-shape.

As shown in FIG. 1, a photographic lens 14, a strobe unit 16, a self-timer lamp 18, an AF auxiliary lamp 20, and so forth are arranged on the front side of the camera body 12. A shutter button 22, a power button 26, and so forth are arranged on the upper surface.

Meanwhile, as shown in FIG. 2, a monitor 28, a zoom button 30, a playback button 32, a DISP/BACK button 34, a cross button 36, a MENU/OK button 38, and so forth are arranged on the back side of the camera body 12.

Although not shown, a tripod screw hole and a battery cover which can be freely opened and closed are arranged on the bottom of the camera body 12. A battery storage chamber for storing a battery and a memory card slot for mounting a memory card are arranged inside the battery cover.

The photographic lens 14 is constituted by a collapsible AF zoom lens and is drawn out from the camera body 12 as the power of the electronic camera 10 is turned on. The zoom mechanism and the collapse mechanism of the photographic lens 14 are known in the art, and thus, specific configurations will not be described.

The strobe unit 16 is constituted by, for example, a xenon tube and emits light as necessary during photographing.

The self-timer lamp 18 is constituted by, for example, LED, and emits light and flickers in a predetermined manner during self-timer photographing to notify the object of the photographing timing.

The AF auxiliary lamp 20 is constituted by, for example, high intensity LED and emits light as necessary during AF.

The shutter button 22 is constituted by a two-step stroke press button consisted of so-called "half-press" and "full-press". During photographing, when the shutter button 22 is half-pressed, the electronic camera 10 prepares for photographing, in other words, performs AE (Automatic Exposure) and AF (Auto Focus). When the shutter button 22 is full-pressed, the electronic camera 10 performs actual photographing, in other words, photographs and records an image.

The power button 26 is used for turning ON/OFF the power of the electronic camera 10, and when pressed for a fixed time (for example, 2 seconds, which is called long-pressing), the power of the electronic camera 10 is turned ON/OFF.

The monitor 28 is constituted by color LCD. The monitor 28 is used as an image display unit for displaying captured images and as a GUI during various kinds of settings. During photographing, images captured by an imaging element are through-displayed, and the monitor 28 is used as an electronic view finder.

The zoom button 30 is used for instructing zooming and is constituted by a zoom telephoto button 30T for instructing zooming in the telephoto direction and a zoom wide button 30W for instructing zooming in the wide direction. The zoom button 30 is used for instructing expansion and contraction of a playback image during the playback of an image. The playback image is magnified and displayed when the zoom telephoto button 30T is pressed, while the playback image is contracted and displayed when the zoom wide button 30W is pressed.

The playback button 32 is used for instructing switching to the playback mode. When the playback button 32 is pressed during photographing, the electronic camera 10 is switched to the playback mode. If the playback button 32 is pressed for a fixed time (so-called long-pressing) when the power is OFF, the electronic camera 10 is activated in the playback mode.

The cross button 36 is designed to be able to be pressed in the vertical and horizontal four directions. A function is allocated to each direction of the cross button 36 in accordance with the state of the camera. For example, during photographing, a function for switching ON/OFF the macro function is allocated to the left button, while a function for switching the stroboscopic mode is allocated to the right button. A function for changing the brightness of the monitor 28 is allocated to the upper button, while a function for switching ON/OFF the self-timer is allocated to the lower button. During the playback, a frame advance function is allocated to the left button, while a frame back function is allocated to the right button. A function for changing the brightness of the monitor 28 is allocated to the upper button, while a function for deleting the playback image is allocated to the lower button. During various kinds of settings, a function for moving the cursor displayed on the monitor 28 in the direction of each button is allocated.

The MENU/OK button 38 is used for loading the menu screen (MENU function), confirming the selection, instructing the execution of a process (OK function), and the like. The allocated function is switched in accordance with the state of the electronic camera 10.

In the electronic camera 10 of the present embodiment, various kinds of settings of the camera are executed on the menu screen loaded on the monitor by pressing the MENU/OK button 38. Examples of the settings related to photographing include setting of the image size (the number of recorded pixels), setting of the photographic sensitivity (AUTO, 100, 200, 400, 800, 1600, or the like), setting of the type of optical measurement (spot metering, center-weighted metering, multi-pattern metering, and the like), setting of the color saturation (high/medium/low), setting of the sharpness (high/medium/low), setting of the white balance mode (auto, manual, shade, fair weather, cloudy, incandescent light, fluorescent light, or the like), setting of the AF system (single AF, continuous AF, or the like), setting of the continuous shooting (ON/OFF), setting of the AE mode (auto, program AE, aperture priority AE(A), shutter speed priority AE(S), manual AE(M), scene program AE(SP), or the like), and setting of the scene program AE ("person photographing mode" for photographing a person, "landscape photographing mode" for photographing a landscape, "sports photographing mode" for photographing a sport, "night scene photographing mode" for photographing a night scene, "underwater photographing mode" for photographing in water, "group photographing mode" for photographing a group photo, or the like). Examples of the settings related to playback include deletion of an image (one-frame deletion of the display image, all-frame deletion, or the like), formatting of a memory card, and setting of a DPOF. Examples of basic setting items of the camera include setting of date and time, setting of the shutter sound (ON/OFF), setting of the shutter volume (large/medium/small/OFF), setting of the operation volume (large/medium/small/OFF), and setting of the brightness of the monitor.

The DISP/BACK button 34 is used for instructing switching of the display (DISP function) of the monitor 28 and for instructing canceling and the like (BACK function) of the input operation. The function allocated is switched in accordance with the setting condition of the electronic camera 10.

Figure 3:
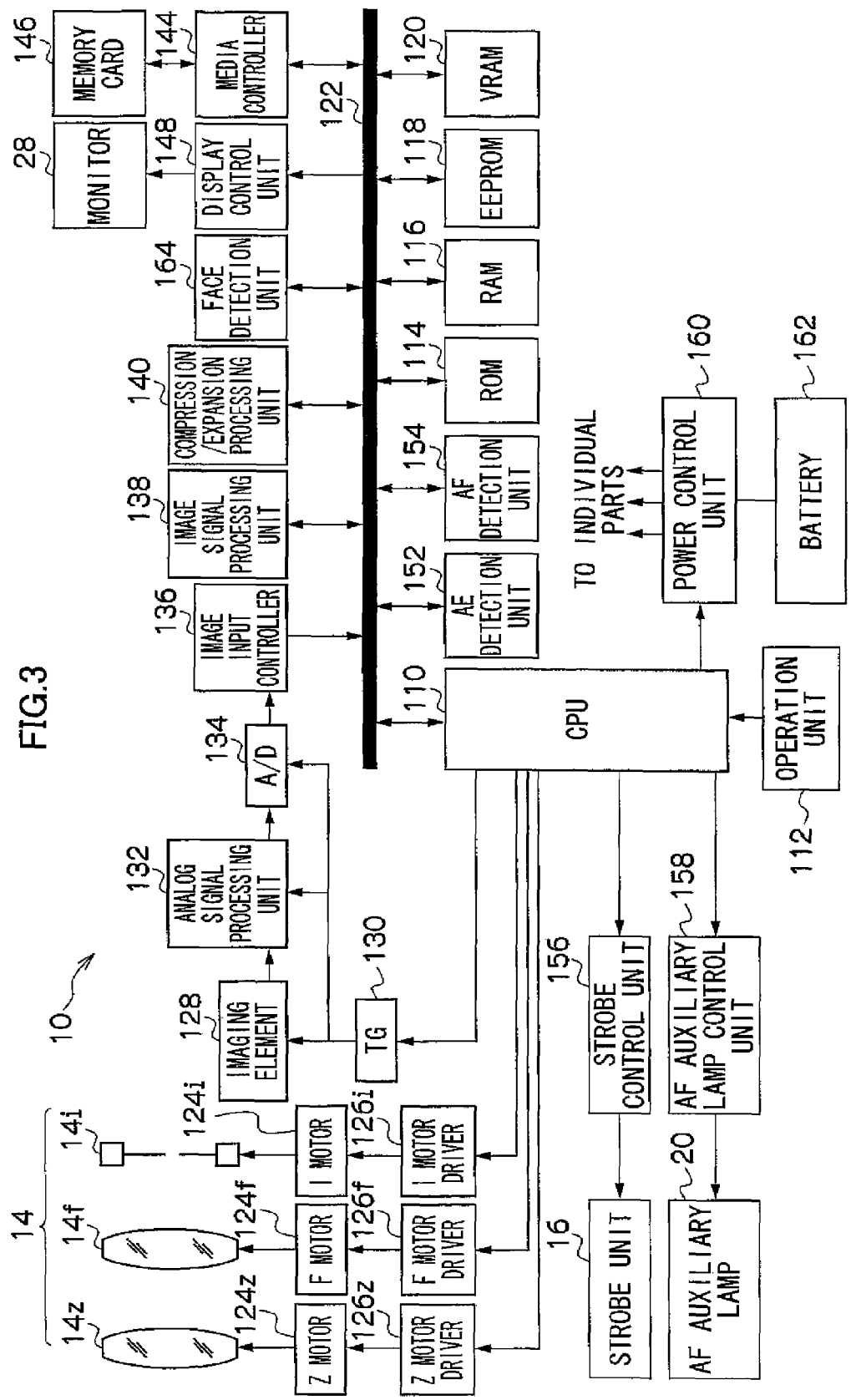
FIG. 3 is a block diagram of an electric configuration of the electronic camera.

FIG. 3 is a block diagram of an electric configuration of the electronic camera 10 of the present embodiment.

As shown in FIG. 3, the electronic camera 10 comprises a CPU 110, an operation unit 112 (shutter button 22, mode lever 24, power button 26, zoom button 30, playback button 32, DISP/BACK button 34, cross button 36, MENU/OK button 38, and the like), a ROM 114, a RAM 116, an EEPROM 118, a VRAM 120, a photographic lens 14, an imaging element 128, a timing generator 130, an analog signal processing unit 132, an A/D converter 134, an image input controller 136, an image signal processing unit 138, a compression/expansion processing unit 140, a media controller 144, a memory card 146, a display control unit 148, an AE detection unit 152, an AF detection unit 154, a strobe control unit 156, an AF auxiliary lamp control unit 158, a power control unit 160, a battery 162, a face detection unit 164, and so forth.

The CPU 110 controls individual parts of the electronic camera 10 in compliance with a predetermined control program based on the input from the operation unit 112. The control program executed by the CPU 110, various data needed for the control, and the like are stored in the ROM 114. Information of various kinds of settings and the like such as information set by the user is stored in the EEPROM 118.

The RAM 116 is used as a work area of the CPU 110 and as a temporary storage area of image data, while the VRAM 120 is used as a temporary storage area dedicated for the image data for display.

The photographic lens 14 is constituted by the AF zoom lens as described, and includes a zoom lens 14z for zooming, a focus lens 14f for focusing, and an aperture 14i for adjusting the quantity of light.

The zoom lens 14z is driven by a zoom motor 124z and moves back and forth on the optical axis. This optically changes the magnification of an object image formed on the light receiving surface of the imaging element 128. The CPU 110 controls the zoom motor 124z through the zoom motor driver 126z to control the movement of the zoom lens 14z, thereby controlling zooming.

The focus lens 14f is driven by the focus motor 124f and moves back and forth on the optical axis. The focus lens 14f is thus focused. The CPU 110 controls the focus motor 124f through the focus motor driver 126f to control the movement of the focus lens 14f, thereby focusing the focus lens 14f.

The aperture 14i is constituted by, for example, an iris diaphragm, and driven and operated by an iris motor 124i. The CPU 110 controls the iris motor 124i through the iris motor driver 126i to control the operation of the aperture 14i, thereby controlling the quantity of incident light on the light receiving surface of the imaging element 128.

The imaging element 128 is constituted by a CCD image sensor having a predetermined RGB color filter array, and is driven and operated by the timing generator (TG) 130. More specifically, the imaging element 128 uses a drive pulse provided by the timing generator 130 to read out the signal charges accumulated in individual pixels (photo sensors) and sequentially outputs a voltage signal (analog image signal) in accordance with the signal charges. The imaging element 128 uses a shutter gate pulse provided by the timing generator 130 to discharge the signal charges accumulated on individual pixels to the shutter drain through the shutter gate. The charge accumulation time of individual pixels can be controlled by controlling the discharge, allowing control of the exposure time or the shutter speed. The CPU 110 controls the imaging element 128 through the timing generator 130 to control the reading out of the charge accumulation time (shutter speed) and the image signal.

The analog signal processing unit 132 performs correlated double sampling to the analog image signal outputted from the imaging element 128, and amplifies and outputs the image.

The A/D converter 134 converts the analog image signals of R, C, and B outputted from the analog signal processing unit 132 into digital image signals and outputs them.

The image input controller 136 contains a predetermined capacity of line buffers, and accumulates image signals of one frame outputted from the A/D converter 134 in accordance with an instruction from the CPU 110 and stores the image signals in the RAM 116.

The image signal processing unit 138 comprises a synchronization circuit (processing circuit which interpolates the spatial dislocation of a color signal associated with the color filter array of the single-plate CCD and which simultaneously converts the color signal), a white balance correction circuit, a gamma correction circuit, a contour correction circuit, a luminance/color-difference signal generation circuit, and the like. The image signal processing unit 138 imports an image signal stored in the RAM 116 through the image input controller 136 in compliance with an instruction from the CPU 110 and performs required signal processing to generate an image signal (Y/C signal) constituted by a luminance signal (Y) and color-difference signals (Cr and Cb). The generated image signal image data is stored in the RAM 116 and the VRAM 120.

The compression/expansion processing unit 140 imports the Y/C signal generated by the image signal processing unit 138 from the RAM 116 in compliance with an instruction from the CPU 110 and performs a predetermined compression process to generate compressed image data in a predetermined form (for example, JPEG). The compression/expansion processing unit 140 imports the compressed image data in compliance with an instruction from the CPU 110 and performs a predetermined expansion process to generate an uncompressed Y/C signal.

The media controller 144 controls reading/writing of data to the memory card 146 mounted on a media slot in compliance with an instruction from the CPU 110. For example, the media controller 144 records image data obtained by photographing in the memory card 146 and reads out the image data recorded in the memory card 146 in response to a readout instruction.

The display control unit 148 controls display of the monitor 28 in compliance with an instruction from the CPU 110. More specifically, the display control unit 148 imports a Y/C signal from the VRAM 120 in compliance with the instruction from the CPU 110, and converts the Y/C signal into a signal format for displaying on the monitor 28 (for example, NTSC signal, PAL signal, or SCAM signal) and outputs it to the monitor 28. Additionally in compliance with an instruction from the CPU 110, the display control unit 148 outputs information such as character, symbol, and figure (predetermined operation information or menu screen, imaging information during photographing (aperture value, shutter speed, imaging sensitivity, possible number of photographs, battery power remaining, date and time information, and the like), AF frame denoting a focus area, imaging auxiliary lines denoting horizontal and vertical lines, playback information during playback (frame number, total photographs taken, imaged date and time, battery power remaining, and the like), error messages on the occurrence of errors, and the like) on the monitor 28.

The AE detection unit 152 imports an image signal stored in the RAM 116 through the image input controller 136 in compliance with an instruction from the CPU 110 and calculates integrated values required for the AE control. More specifically, the detection unit 152 divides one screen into a plurality of areas (for example, eight by eight) and calculates the integrated values of image signals of R, G, and B of each divided area. During the AE control, the CPU 110 finds the brightness of the object based on the integrated values obtained from the AE detection unit 152 and calculates an exposure value (EV value) suitable for photographing. The CPU 110 then determines the aperture value and the shutter speed from the calculated EV value in accordance with a predetermined program diagram.

The AF detection unit 154 imports image signals of R, G, and B stored in the RAM 116 through the image input controller 136 in compliance with an instruction from the CPU 110 and calculates the focus evaluation value required for the AF control. The AF detection unit 154 includes a high-pass filter which only passes high frequency components of G signal, an absolute value acquiring processor, a focus area extracting unit which cuts out a signal in a predetermined focus area set on the screen, and an integration unit which integrates absolute value data in the focus area. The AF detection unit 154 outputs the absolute value data in the focus area integrated by the integration unit to the CPU 110 as a focus evaluation value. During the AF control, the CPU 110 searches the position where the focus evaluation value outputted from the AF detection unit 154 becomes the maximum and performs focusing by moving the focus lens 14f to the position.

The strobe control unit 156 controls light emission of the strobe unit 16 in compliance with an instruction from the CPU 110.

The AF auxiliary lamp control unit 158 controls light emission of the AF auxiliary lamp 20 in compliance with an instruction of the CPU 110. More specifically, if the CPU 110 determines during AF that the object is dark or determines that the contrast of the object is low, the CPU 110 causes the AF auxiliary lamp 20 to emit light through the AF auxiliary lamp control unit 158 and causes the AF auxiliary lamp to be directed to the object to perform the AF control.

The power control unit 160 controls power supply to individual parts from the battery 162 in compliance with an instruction from the CPU 110.

The face detection unit 164 imports the Y/C signal generated by the image signal processing unit 138 from the RAM 116 in compliance with an instruction from the CPU 110 and detects the face area of the person from the photographed image.

The method of detecting the face from an image is known in the art, and therefore, the description of the specific method will be omitted. Methods of detecting the face include, for example, a method of pattern matching with a face template, a method of extracting flesh-color data from the original image to extract a cluster of photometric points as the face, the photometric points determined to be in a flesh-color range, a method of converting the photometric data into hue and color saturation to create the two-dimensional histogram of the converted hue/color saturation and analyzing it to determine the face area, a method of extracting a face candidate area equivalent to the shape of the face of the person to determine the face area from the amount of features in the area, and a method of extracting the contour of the face of the person from the image to determine the face area.

In the person photographing mode, the CPU 110 adds an image (for example, image for through display) obtained from the imaging element 128 to the face detection unit 164 before the actual photographing and detects the face of the person. The CPU 110 then performs the AF control such that the detected face is in focus and performs the AE control such that the face is in a proper brightness. The CPU 110 processes the image obtained by photographing, the process suitable for the image of the person. For example, the CPU 110 processes the image by adjusting the brightness, color saturation, sharpness, and the like, so that the skin of the person looks beautiful.

In the person photographing mode, the CPU 110 calculates the position and the size of the face of the person in the image based on the detection result of the face detection unit 164 and controls zooming so that the face is photographed in a certain size. The control of zooming is conducted in response to the half-press of the shutter button 22.

This concludes the description the configuration of the electronic camera 10 of the present embodiment.

The effects of the electronic camera 10 of the present embodiment configured as mentioned above will now be described.

The basic operations of photographing and recording by the electronic camera 10 of the present embodiment will be described first.

Once the power button 26 is pressed, the electronic camera 10 is activated under the photographing mode.

The zoom motor 124z is driven by the zoom motor driver 126z, and the photographic lens 14 is drawn out to a predetermined position. Once the photographic lens 14 is drawn out to the predetermined position, through-the-lens images are displayed on the monitor 28. More specifically, the imaging element 128 continuously captures images, the image signals are continuously processed, and the Y/C signals are continuously generated. The generated Y/C signals are sequentially added to the display control unit 148 through the VRAM 120, converted to a signal format for display, and outputted to the monitor 28. This leads to a through-display of the images captured by the imaging element 28 through the photographic lens 14 on the monitor 28.

The photographer checks the through-the-lens images displayed on the monitor 28 to determine the composition and then half-presses the shutter button 22.

When the shutter button 22 is half-pressed, a S1 ON signal is inputted to the CPU 110. The CPU 110 prepares for photographing in response to the S1 ON signal, more specifically, performs the processes of AE and AF.

The image signal outputted from the imaging element 128 is imported to the RAM 116 through the analog signal processing unit 132, the A/D converter 134, and the image input controller 136 and added to the AE detection unit 152 and the AF detection unit 154.

The AE detection unit 152 calculates the integrated values required for the AE control based on the inputted image signal and outputs the integrated values to the CPU 110. The CPU 110 finds the brightness of the object from the integrated values obtained from the AE detection unit 152 and calculates the imaging EV. The CPU 110 then determines the aperture value and the shutter speed during the actual photographing from the imaging EV value in accordance with the predetermined program diagram.

The AF detection unit 154 calculates the focus evaluation value required for the AF control based on the inputted image signal and outputs the focus evaluation value to the CPU 110. The CPU 110 controls the focus lens motor 124f based on the output from the AF detection unit 154 and controls the movement of the focus lens 14f to focus the main object. In this case, the CPU 110 causes the AF auxiliary lamp 20 to emit light as necessary.

The photographer checks the through-the-lens images displayed on the monitor 28 to check the focus. The photographer operates the zoom button 30 as necessary to determine the composition. Once the object which the photographer wants to photograph is in focus, and the composition is determined, the photographer instructs the actual photographing, in other words, fully presses the shutter button 22.

As the shutter button 22 is full-pressed, an S2 ON signal is inputted to the CPU 110. The CPU 110 performs photographing and recording in response to the S2 ON signal.

The imaging element 128 is exposed in the aperture value and the shutter speed obtained from the AE process, and the image signal for recording is imported.

The image signal of one frame outputted from the imaging element 128 is imported to the image input controller 136 through the analog signal processing unit 132 and the A/D converter 134, and stored in the RAM 116. The image signal stored in the RAM 116 is added to the image signal processing unit 138 under the control of the CPU 110. The image signal processing unit 138 conducts predetermined signal processing on the inputted image signal and generates an image signal (Y/C signal) consisted of a luminance signal (Y) and color-difference signals (Cr and Cb).

The Y/C signal generated by the image signal processing unit 13g is temporarily stored in the RAM 116 and later added to the compression/expansion processing unit 140. The compression/expansion processing unit 140 conducts predetermined compression processing to the Y/C signal and generates compressed image data in a predetermined form.

The compressed image data generated by the compression/expansion processing unit 140 is stored in the RAM 116. The CPU 110 generates a still image file (for example, Exif) in a predetermined format in which predetermined attached information (photographing conditions such as aperture value, shutter speed, and sensitivity or various information in relation to photographing such as photographed date and time) is added to the compressed image data stored in the RAM 116. The CPU 110 records the still image file in the memory card 146 through the media controller 144.

This concludes the description of the basic operations of photographing and recording of the electronic camera 10 of the present embodiment.

An operation of playing back of recorded images in the electronic camera 10 of the present embodiment will now be described.

The images recorded in the memory card 146 can be played back and displayed on the monitor 28 by setting the mode of the electronic camera 10 to the playback mode. Switching to the playback mode is conducted by pressing the playback button 32.

Once the playback button 32 is pressed, the CPU 110 reads out the compressed image data of the image file recorded lastly in the memory card 146 through the media controller 144.

The compressed image data read out from the memory card 146 is added to the compression/expansion processing unit 140, and converted to uncompressed image data and added to the VRAM 120. The data is outputted to the monitor 28 from the VRAM 120 through the display control unit 148. As a result, the images recorded in the memory card 146 are played back and displayed on the monitor 28.

The frame advancing of the images is conducted by operating the left and right keys of the cross button 36. When the right key is operated, the next image file is read out from the memory card 146, which is then played back and displayed on the monitor 28. When the left key of the cross button 36 is operated, the prior image file is read out from the memory card 146, which is then played back and displayed on the monitor 28.

The images recorded in the memory card 146 are played back as described.

As mentioned above, when the photographing mode is set to the person photographing mode in the electronic camera 10 of the present embodiment, the face of the person is detected from the images photographed for the through display, and the AF control is conducted so as to focus the detected face, while the AE control is conducted such that the face is in a proper brightness. The automatic zooming is conducted so that the detected face becomes a certain size. When the actual photographing is performed, the image processing suitable for the image of person is performed to the image obtained by the actual photographing.

The operations of photographing and recording by the electronic camera 10 of the present embodiment in the person photographing mode will now be described.

Figure 4:
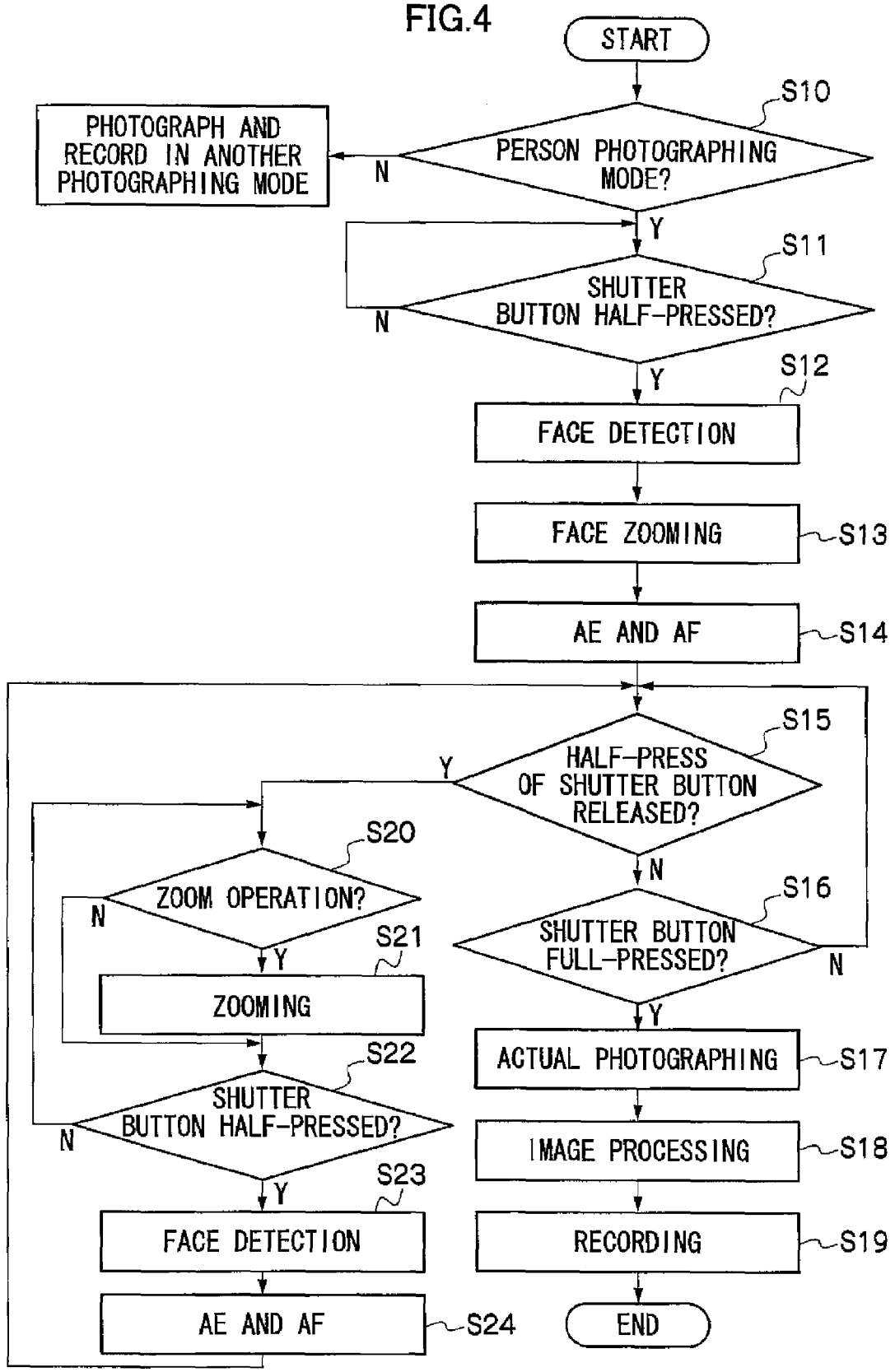
FIG. 4 is a flow chart of the procedure of operations of photographing and recording by the electronic camera in the person photographing mode.

FIG. 4 is a flow chart of the procedure of operations of photographing and recording by the electronic camera 10 of the present embodiment in the person photographing mode.

The CPU 110 determines whether the photographing mode is set to the person photographing mode based on the setting condition of the camera (step S10).

As described, the setting of the person photographing mode is conducted by selecting the items of setting the AE mode and the scene program AE on the menu screen. More specifically, the setting is conducted by selecting the items of setting the AE mode and the scene program AE on the menu screen, setting the AE mode to "scene program AE" on the setting screen of the AE mode and the scene program AE, and setting the scene program AE to "person photographing mode". The setting condition of the camera is recorded in the EEPROM 118, and the CPU 110 reads out the information recorded in the EEPROM 118 to determine whether the current photographing mode is set to the person photographing mode.

A button, a dial, or the like exclusively used for setting the person photographing mode may be prepared to set the person photographing mode with these operation buttons or the like.

If the CPU 110 determines that a mode other than the person photographing mode is set, the CPU 110 processes in accordance with the set mode.

On the other hand, if the CPU 110 determines that the person photographing mode is set the CPU 110 determines whether the shutter button 22 is half-pressed based on the input from the operation unit 112 (step S11). If the CPU 110 determines that the shutter button 22 is half-pressed, the CPU 110 performs the process of face detection (step S12).

More specifically, the CPU 110 adds the image obtained for the through display to the face detection unit 164 to detect the face of the person. The CPU 110 then calculates the position and the size of the face of the person in the image based on the detection result of the face detection unit 164 and zooms the face such that the face will be photographed in a certain size (step S13). For example, the face is zoomed so that the ratio of the face of the person relative to the entire photographed area becomes a predetermined ratio (for example, 70% of the entire area).

For instance, the face is zoomed in the following manner. The face is gradually zoomed in predetermined steps, and in each step, the face detection unit 164 detects the face. The zooming stops when the detected face reaches a certain size. This allows the size of the face of the person in the image captured by the imaging element 128 to have a certain size.

After zooming the face to make the face of the person in the image a certain size, the CPU 110 conducts the AE and AF processes to bring the person in the image into focus and determines the exposure value so that the face of the person in the image has an appropriate brightness (step S14).

The CPU 110 then determines whether the half-press of the shutter button 22 is released based on the input from the operation unit 112 (step S15). If the CPU 110 determines that the half-press of the shutter button 22 is not released, the CPU 110 determines whether the shutter button 22 is full-pressed based on the input from the operation unit 112 (step S16). If the CPU 110 determines that the shutter button 22 is full-pressed, the actual photographing is conducted (step S17). The obtained image is subjected to image processing suitable for the person photographing (step S18) and recorded in the memory card 146 (step S19).

On the other hand, if the CPU 110 determines that the half-press of the shutter button 22 is released at step S15, the CPU 110 determines whether the zoom operation is conducted based on the input from the operation unit 112 (step S20). If the CPU 110 determines that the zoom operation is conducted, the zooming is controlled based on the operation amount (step S21).

Subsequently, the CPU 110 again determines whether the shutter button 22 is half-pressed based on the input from the operation unit 112 (step S22). If the CPU 110 determines that the shutter button 22 is half-pressed, the face detection is performed (step S23), and the AE and AF processes are conducted based on the detection result (step S24). More specifically, the CPU 110 brings the detected person into focus and determines the exposure value so that the face of the person in the image has an appropriate brightness.

After the AE and AF processes, the CPU 110 returns to step S15 and again determines whether the half-press of the shutter button 22 is released based on the input from the operation unit 112 (step S15). If the CPU 110 determines that the half-press of the shutter button 22 is not released, the CPU 110 determines whether the shutter button 22 is full-pressed based on the input from the operation unit 112 (step S16). If the CPU 110 determines that the shutter button 22 is full-pressed, the actual photographing is conducted (step S17). The obtained image is subjected to image processing suitable for the person photographing (step S18) and recorded in the memory card 146 (step S19).

As mentioned, in the electronic camera 10 of the present embodiment, the first half-press of the shutter button 22 automatically zooms the face (face zooming) such that the face of the person becomes a certain size. This enables to easily and quickly photograph an image in which the face of a person has a certain size, and enables to avoid taking time for zooming and thus missing an opportunity to press the shutter.

If modification of the composition is desired when the automatic zooming is performed, zooming after the release of the half-press of the shutter button 22 allows easy modification of the composition, thereby enabling to easily photograph an image in a composition desired by the photographer. Only a small adjustment is required in this case, enabling to quickly photograph an image in a photographer's desired composition, thereby preventing missing an opportunity to press the shutter.

The electronic camera 10 of the present embodiment is user-friendly, allowing quick zooming of the face of the person, because the face is zoomed in response to the half-press of the shutter button 22.

Additionally, an instruction button (face zooming button) for zooming the face may be implemented on the camera body 12 to zoom the face when the face zooming button is pressed.

Figure 5:
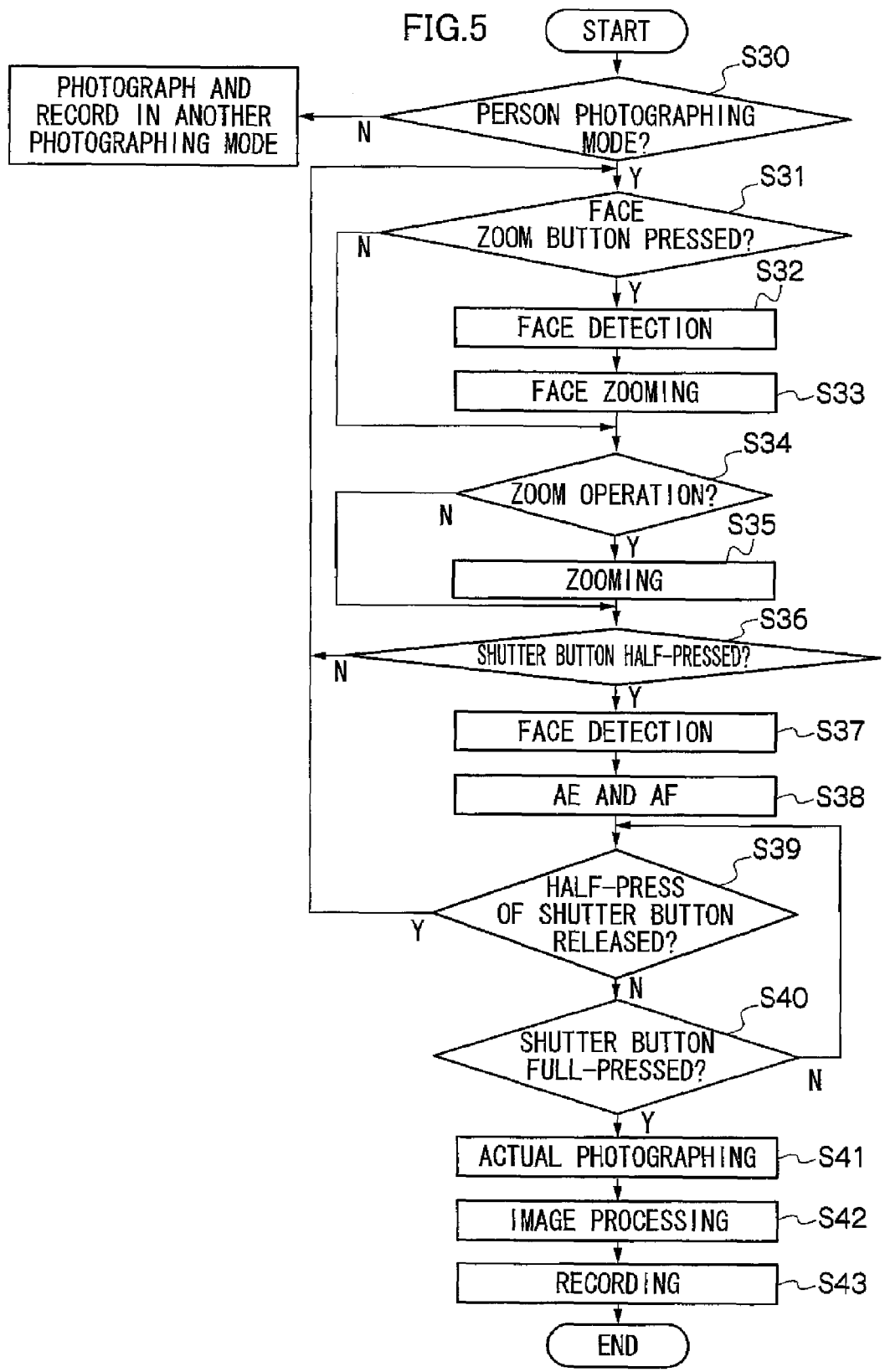
FIG. 5 is a flow chart of the procedure of operations of photographing and recording by the electronic camera when zooming the face with a face zooming button.

FIG. 5 is a flow chart of the procedure of operations of photographing and recording by the electronic camera 10 when zooming the face with the face zooming button.

The CPU 110 determines whether the photographing mode is set to the person photographing mode based on the setting condition of the camera (step S30). When a mode other than the person photographing mode is set, the process according to the set mode is performed.

On the other hand, if the CPU 110 determines that the person photographing mode is set, the CPU 110 determines whether the face zoom button is pressed based on the input from the operation unit 112 (step S31).

If the CPU 110 determines that the face zoom button is pressed, the CPU 110 performs the face detection (step S32). Based on the result of the face detection, the CPU 110 calculates the position and the size of the face of the person in the image and zooms the face such that the face is photographed in a certain size (step S33).

The CPU 110 determines whether the zooming operation is conducted based on the input from the operation unit 112 (step S34). If the CPU 110 determines that the zoom operation is conducted, the zooming is controlled based on the operation amount (step S35).

Subsequently, the CPU 110 determines whether the shutter button 22 is half-pressed based on the input from the operation unit 11 (step S36). If the CPU 110 determines that the shutter button 22 is half-pressed, the face detection is conducted (step S37) and the AE and AF processes are conducted based on the detection result (step S38).

After the AE and AF processes, the CPU 110 determines whether the half-press of the shutter button 22 is released based on the input from the operation unit 112 (step S39). If the CPU 110 determines that the half-press of the shutter button 22 is released, the CPU 110 returns to step S31 and again determines whether the face zoom button is pressed (step S31).

On the other hand, if the CPU 110 determines that the half-press of the shutter button 22 is not released, the CPU 110 determines whether the shutter button 22 is full-pressed based on the input from the operation unit 112 (step S40). If the CPU 110 determines that the shutter button 22 is full-pressed, the CPU 110 conducts the actual photographing (step S41). The obtained image is subjected to image processing suitable for the person photographing (step S42) and recorded in the memory card 146 (step S43).

The face may be zoomed with the face zoom button (not shown) arranged on the camera body 12 as just described. An image in which the face of a person is photographed in a certain size can also be easily and quickly photographed in this case. This also allows easy and quick modification to the photographer's desired composition, enabling to easily photograph an image in a desired composition.

The face zooming may be designed to continue until the shutter button 22 is half-pressed when the person photographing mode is set.

Figure 6:
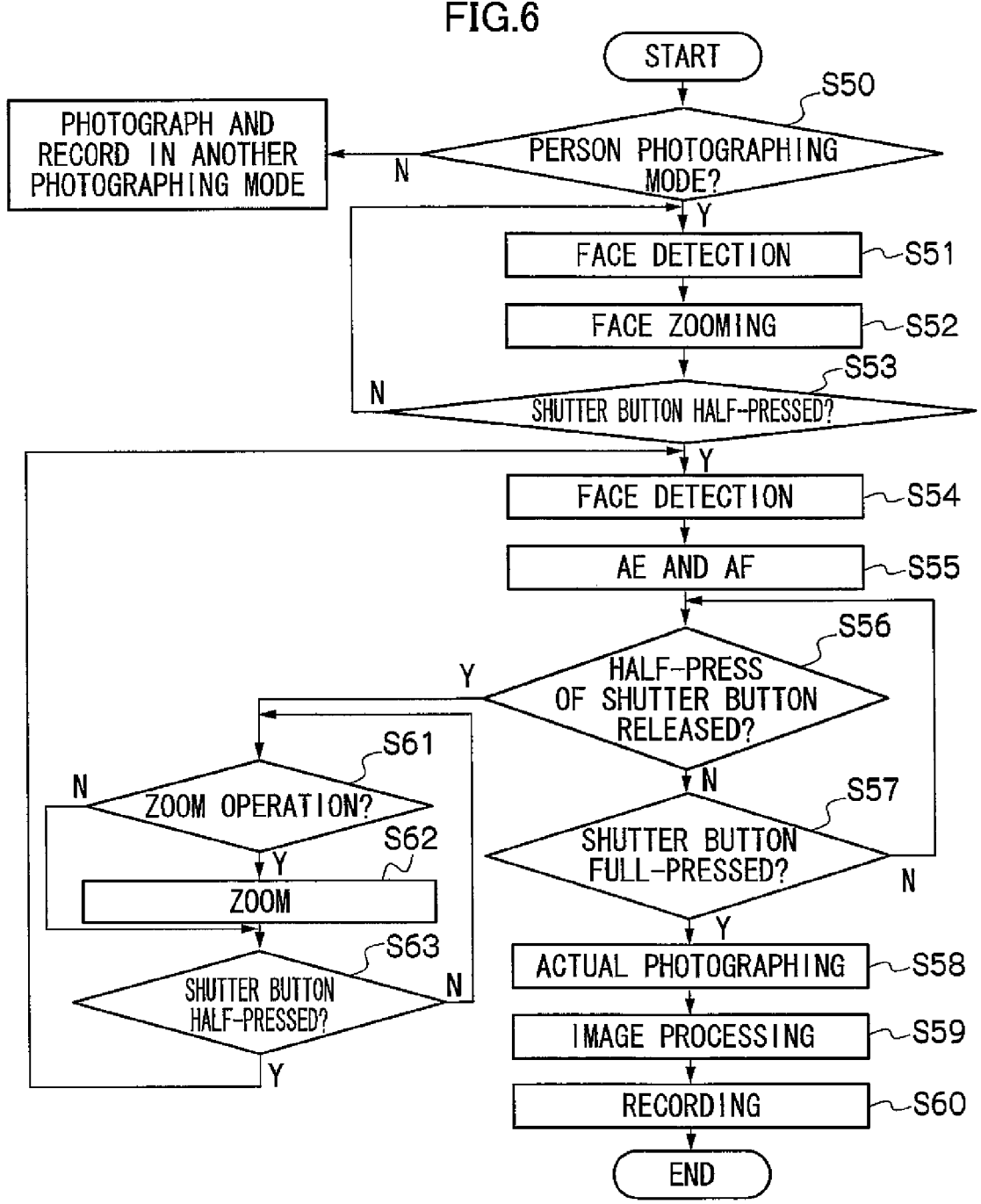
FIG. 6 is a flow chart of the procedure of operations of photographing and recording by the electronic camera when zooming the face until the shutter button is half-pressed.

FIG. 6 is a flow chart of the procedure of operations of photographing and recording by the electronic camera 10 when zooming the face until the shutter button 22 is half-pressed.

The CPU 110 determines whether the photographing mode is set to the person photographing mode based on the setting condition of the camera (step S50). If a mode other than the person photographing mode is set, the process according to the set mode is conducted.

On the other hand, if the CPU 110 determines that the person photographing mode is set, the face detection is conducted (step S51). The CPU 110 calculates the position and the size of the face of the person in the image based on the detection result and zooms the face such that the face is photographed in a certain size (step S52).

Subsequently, the CPU 110 determines whether the shutter button 22 is half-pressed based on the input from the operation unit 112 (step S53). If the CPU 110 determines that the shutter button 22 is half-pressed, the face detection is conducted (step S54), and the AE and AF processes are conducted based on the detection result (step S55).

After the AE and AF processes, the CPU 110 determines whether the half-press of the shutter button 22 is released based on the input from the operation unit 112 (step S56). If the CPU 110 determines that the half-press of the shutter button 22 is released and determines that the zoom operation is conducted, the zooming is controlled based on the operation amount (step S62). The CPU 110 then determines whether the shutter button 22 is half-pressed based on the input from the operation unit 112 (step S63). If the CPU 110 determines that the shutter button 22 is half-pressed, the CPU 110 returns to step S54 to detect the face (step S54), and the AE and AF processes are conducted based on the detection result (step S55). After the AE and AF processes, the CPU 110 determines whether the half-press of the shutter button 22 is released based on the input from the operation unit 112 (step S56).

If the CPU 110 determines that the half-press of the shutter button 22 is not released, the CPU 110 determines whether the shutter button 22 is full-pressed based on the input from the operation unit 112 (step S57). If the CPU 110 determines that the shutter button 22 is full-pressed, the CPU 110 conducts the actual photographing (step 858), and after applying the image processing suitable for the person photographing to the obtained image (step S59), records the image in the memory card 146 (step S60).

In this way, the face zooming may be performed until the shutter button 22 is half-pressed when the person photographing mode is set. An image in which the face of a person is photographed in a certain size can also be easily and quickly photographed in this case. This also allows easy and quick modification to the photographer's desired composition, enabling to easily photograph an image in a desired composition.

In the electronic camera of the above embodiment, although the face detection is conducted in conjunction with the face zooming or the AE and AF control, the face detection may be conducted any time. More specifically, the face detection may be conducted sequentially or at constant time intervals to the image obtained for the through display. During the face zooming, the detection result may be arbitrarily used for the face zooming.

In the electronic camera of the above embodiment, when detecting the position and the size of the face, a so-called face recognition technique is used to detect the position and the size of the face of the person captured by the imaging element 128. However, the method of detecting the size of the face is not limited to this. For example, when continuously performing the AF process (during so-called continuous AF), the positions of the focus lens and the zoom lens may be detected, and the size of the face of the person captured by the imaging element 128 may be detected from the positions of the focus lens and the zoom lens. More specifically, the distance from the position of the focus lens in focus to the object (object distance) may be found, and the size of the face (average face size) of the person to be photographed may be found from the detected object distance and the position (angle of view) of the zoom lens (calculated using a predetermined function or a table). When zooming the face, the zoom position in which the face of the person becomes a certain size is calculated, and the zoom lens is moved to the position and the zooming is performed. In this case, the face detection is not particularly required.

Figure 7A:
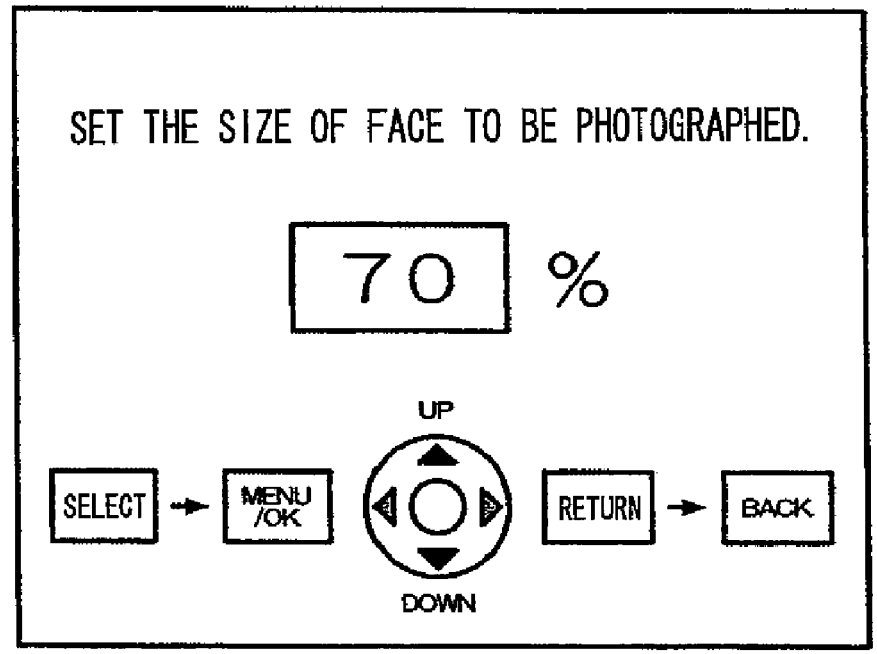
FIGS. 7A and 7B depict one example of a method of setting the size of the face of a person zoomed during the face zooming.
Figure 7B:
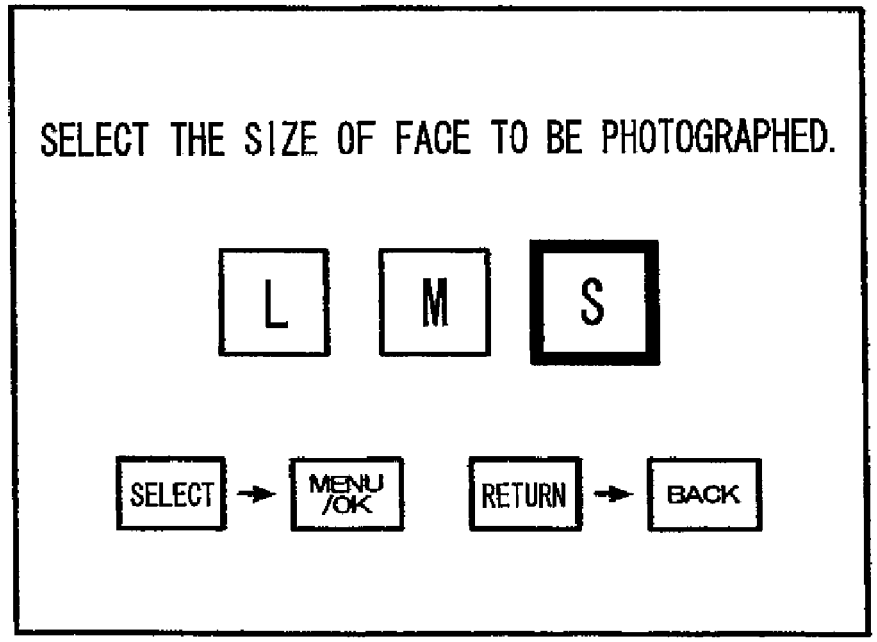

In the electronic camera 10 of the above embodiment, during the face zooming, although the zooming is controlled such that the size of the face of the person becomes a certain size, it is preferable that the user can arbitrarily set the size of the face of the person zoomed during the face zooming. For example, an item for setting the size of the face of the person is preferably prepared in one of the menu items during the face zooming, and when the setting item is selected, the user can arbitrarily set the proportion (%) of the face of the person accounted for in the image on the screen of the monitor 28 as shown in FIG. 7A, or the user can arbitrarily select from preset proportions (for example, large (70%), medium (50%), small (30%), and so forth) on the screen of the monitor 28 as shown in FIG. 7B. In this case, a screen for setting the face size may be automatically displayed on the monitor 28 to set the size of the face when the person photographing mode is set.

The electronic camera 10 may be designed to figure out the user's tendency of the face size setting from user's past person photographing results and designed to automatically zoom to the size of the face high in the setting frequency. In this case, for example, the size of the face of the person is detected from the photographed image every time the actual photographing is conducted in the person photographing mode, and the result is accumulated. The user's tendency of the face size setting is figured out from the accumulated data, the size of the face of the person high in the setting frequency is estimated, and the estimated face size is set as the size of the face of the person during the face zooming.

The method of estimating the size of the face high in the setting frequency from the photographing results of the past includes known analysis methods such as a method of finding the average and a method of finding the distribution. For example, in the method of finding the average, the average of the ratios of the sizes of the faces of the persons photographed in the past in the person photographing mode is found, and the result is defined as the size of the face high in the setting frequency. In this case, for example, when images with face ratios of 70%, 60%, 50%, 70%, 70%, and 80% are photographed, the average of 67% is defined as the size of the face high in the setting frequency. In the method of finding the distribution, the distribution of the ratios of the sizes of the faces of the persons photographed in the past in the person photographing mode is found, and the ratio with the highest distribution is defined as the size of the face high in the setting frequency. In this case, for example, when one image with face ratio of 0 to 10%, one image of 11 to 20%, one image of 21 to 30%, zero image of 31 to 40%, three images of 41 to 50%, three images of 51 to 60%, three images of 61 to 70%, six images with 71 to 80%, four images with 81 to 90%, and zero image with 91 to 100% are photographed, the images with face ratio of 71 to 80% are most frequently photographed. Thus, the intermediate value of 75% is defined as the size of the face high in the setting frequency.

As long as the user's tendency of the face size setting is figured out from the photographing results of the past and the result can be reflected to the next photographing, the specific method is not particularly limited.

Figure 8:
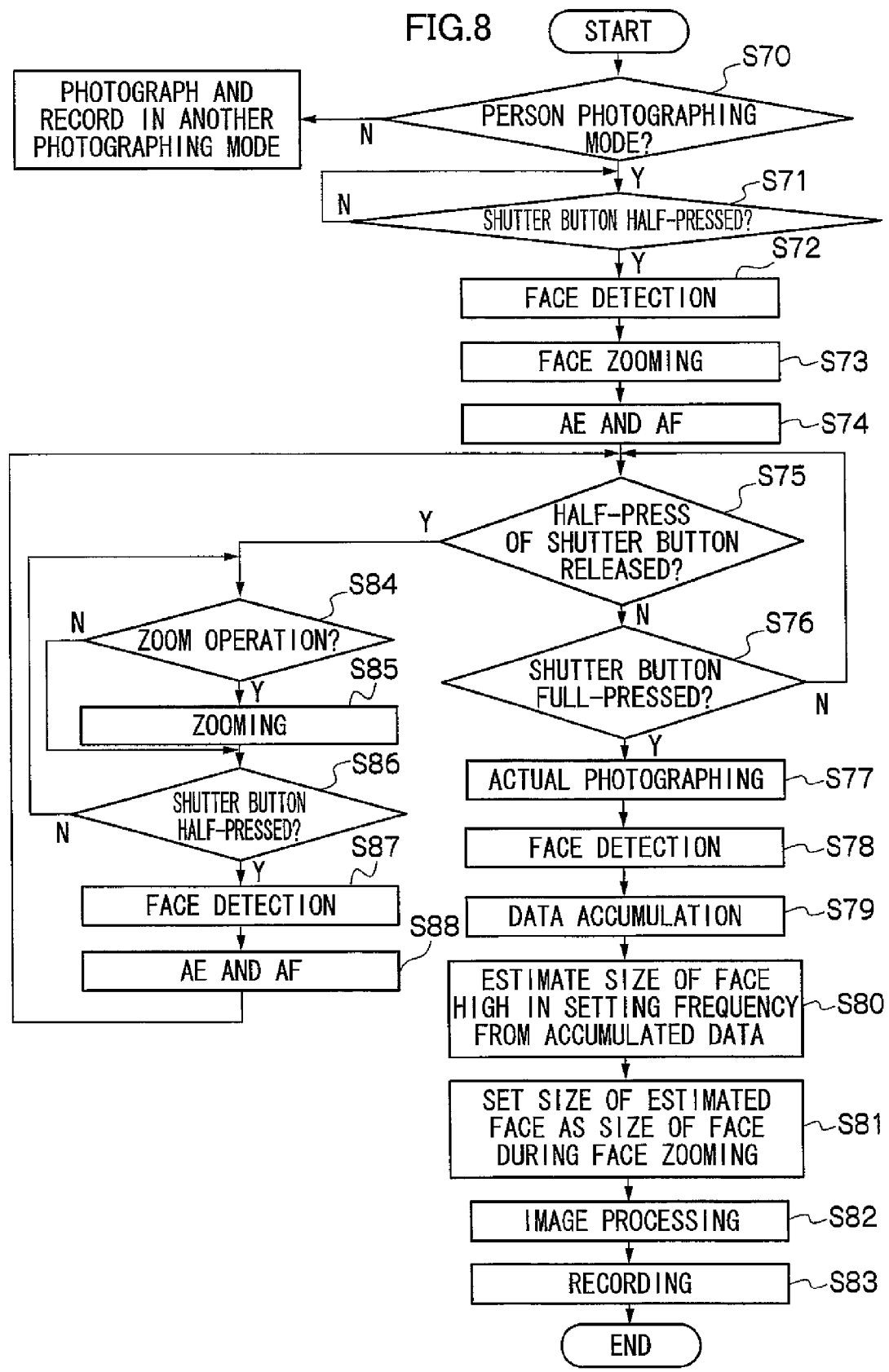
FIG. 8 is a flow chart of the procedure of operations of estimating the size of the face high in the setting frequency based on the user's photographing results of the past and automatically zooming to the size to take a picture in the person photographing mode.

FIG. 8 is a flow chart of the procedure of operations of estimating the size of the face high in the setting frequency based on the user's photographing results of the past and automatically zooming to the size to take a picture in the person photographing mode.

The CPU 110 determines whether the photographing mode is set to the person photographing mode based on the setting condition of the camera (step S70). When a mode other than the person photographing mode is set, the process according to the set mode is performed.

On the other hand, if the CPU 110 determines that the person photographing mode is set, the CPU 110 determines whether the shutter button 22 is half-pressed based on the input from the operation unit 112 (step S71). If the CPU 110 determines that the shutter button 22 is half-pressed, the face detection is conducted (step S72). More specifically, the images obtained for the through display are added to the face detection unit 164 to detect the face of the person. The position and the size of the face of the person in the image are calculated based on the detection result of the face detection unit 164, and the face is zoomed to photograph the face in the set size (step S73).

The size of the zoomed face is set to the size estimated as the size of the face high in the setting frequency from the photographing results of the past, which will be described below.

When the face is zoomed, the CPU 110 conducts the AE and AF processes and brings the person in the image into focus while determining the exposure value so that the face of the person in the image has an appropriate brightness (step S74).

The CPU 110 then determines whether the half-press of the shutter button 22 is released based on the input from the operation unit 112 (step S75). If the CPU 110 determines that the half-press of the shutter button 22 is not released, the CPU 110 determines whether the shutter button 22 is full-pressed based on the input from the operation unit 112 (step S76).

If the CPU 110 determines that the shutter button 22 is full-pressed, the CPU 110 conducts the actual photographing (step S77). The face detection of the photographed image is then conducted (step S78). More specifically, the image data obtained by photographing is added to the face detection unit 164 to extract the face area, and the position and the size of the extracted face is found. The found position and the size of the face are accumulated in a predetermined database (step S79). The database is formed, for example, in the EEPROM 118 and is updated every time the actual photographing is conducted in the person photographing mode.

Subsequently, the CPU 110 estimates the size of the face high in the setting frequency based on the updated database (step S80) and sets the estimated size of the face as the size of the face during the face zooming (step S81). Information of the set size of the face during the face zooming is stored in the EEPROM 118. Automatic zooming to the set size is conducted in the next photographing of a person.

After updating the database and setting the size of the face during the face zooming in such a way, the CPU 110 applies image processing to the image obtained by the actual photographing, the image processing suitable for the person photographing (step S82), and records the image in the memory card 146 (step S83).

Meanwhile, at step S75, if the CPU 110 determines that the half-press of the shutter button 22 is released, the CPU 110 determines whether the zoom operation is conducted based on the input from the operation unit 112 (step S84). If the CPU 110 determines that the zoom operation is conducted, the CPU 110 controls the zooming based on the operation amount (step S85).

The CPU 110 again determines whether the shutter button 22 is half-pressed based on the input from the operation unit 112 (step S86). If the CPU 110 determines that the shutter button 22 is half-pressed, the face detection is conducted (step S87) and the AE and AF processes are conducted based on the detection result (step S88). More specifically, the CPU 110 brings the detected person into focus and determines the exposure value such that the face of the person in the image has an appropriate brightness.

After the AE and AF processes, the CPU 110 returns to step S75 and again determines whether the half-press of the shutter button 22 is released based on the input from the operation unit 112 (step S75). If the CPU 110 determines that the half-press of the shutter button 22 is not released, the CPU 110 determines whether the shutter button 22 is full-pressed based on the input from the operation unit 112 (step S76). If the CPU 110 determines that the shutter button 22 is full-pressed, the actual photographing is conducted (step S77).

An image of a person in a user's desired composition can be more easily and quickly photographed by figuring out the user's tendency of the face size setting from the photographing results of the past and reflecting it in the next photographing.

In the above example, the face area of the person is extracted from the image actually photographed to directly find its size when detecting the size of the face of the person from the image actually photographed. However, the size of the face may be found based on the position information of the focus lens and the position information of the zoom lens during the actual photographing.

Figure 9A:
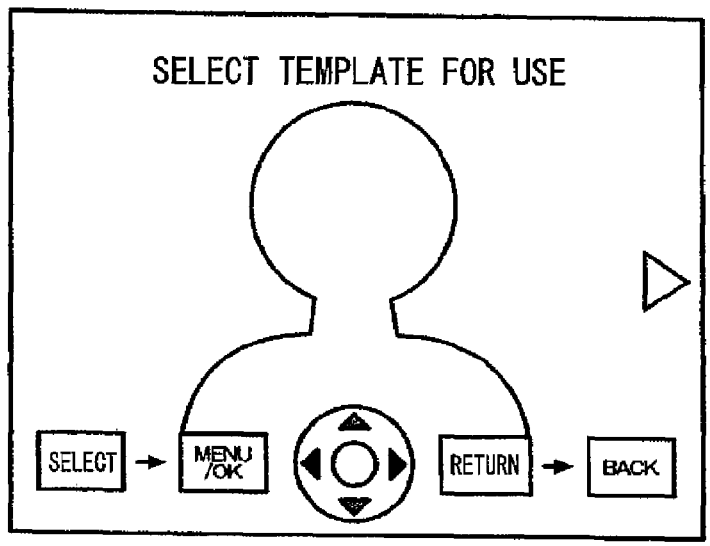
FIGS. 9A to 9C depict one example of a method of setting the size of the face of a person zoomed during the face zooming.
Figure 9B:
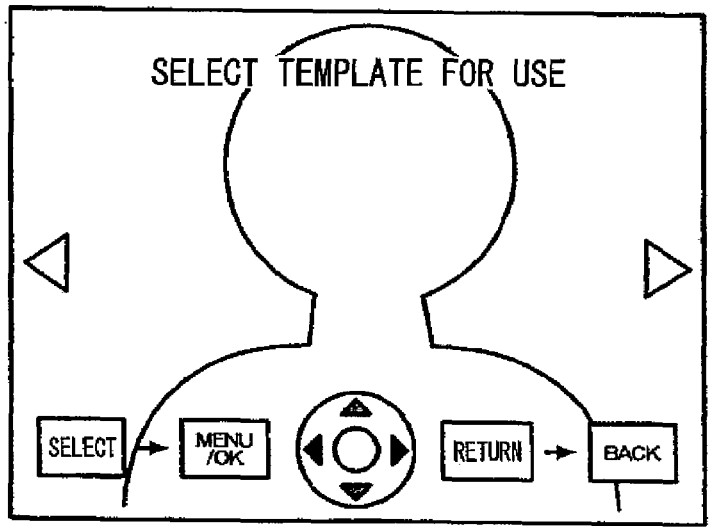
Figure 9C:
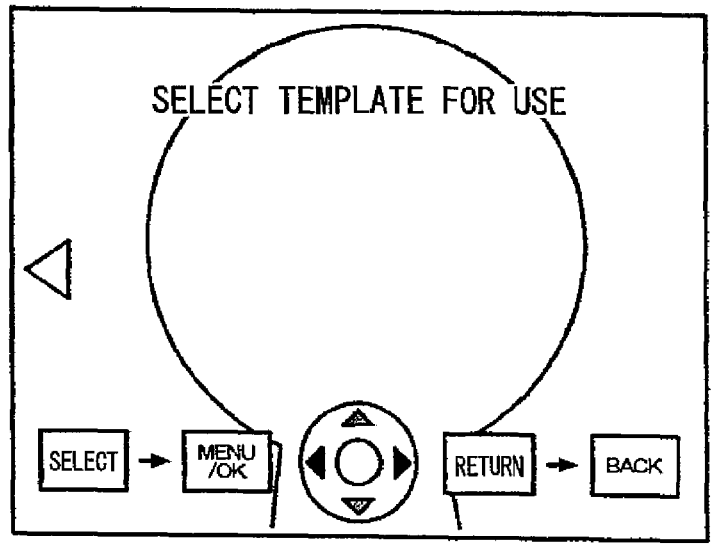

The method of setting the face size of the person to be zoomed during the face zooming is not limited to this, and alternatively, for example, templates may be used for the setting. More specifically, for example, a plurality of templates with different sizes of faces are prepared as shown in FIG. 9, and the user is made to select a template for use. During the face zooming, the zooming is controlled such that the size becomes the same size as the face of the person in the selected template.

Figure 10:
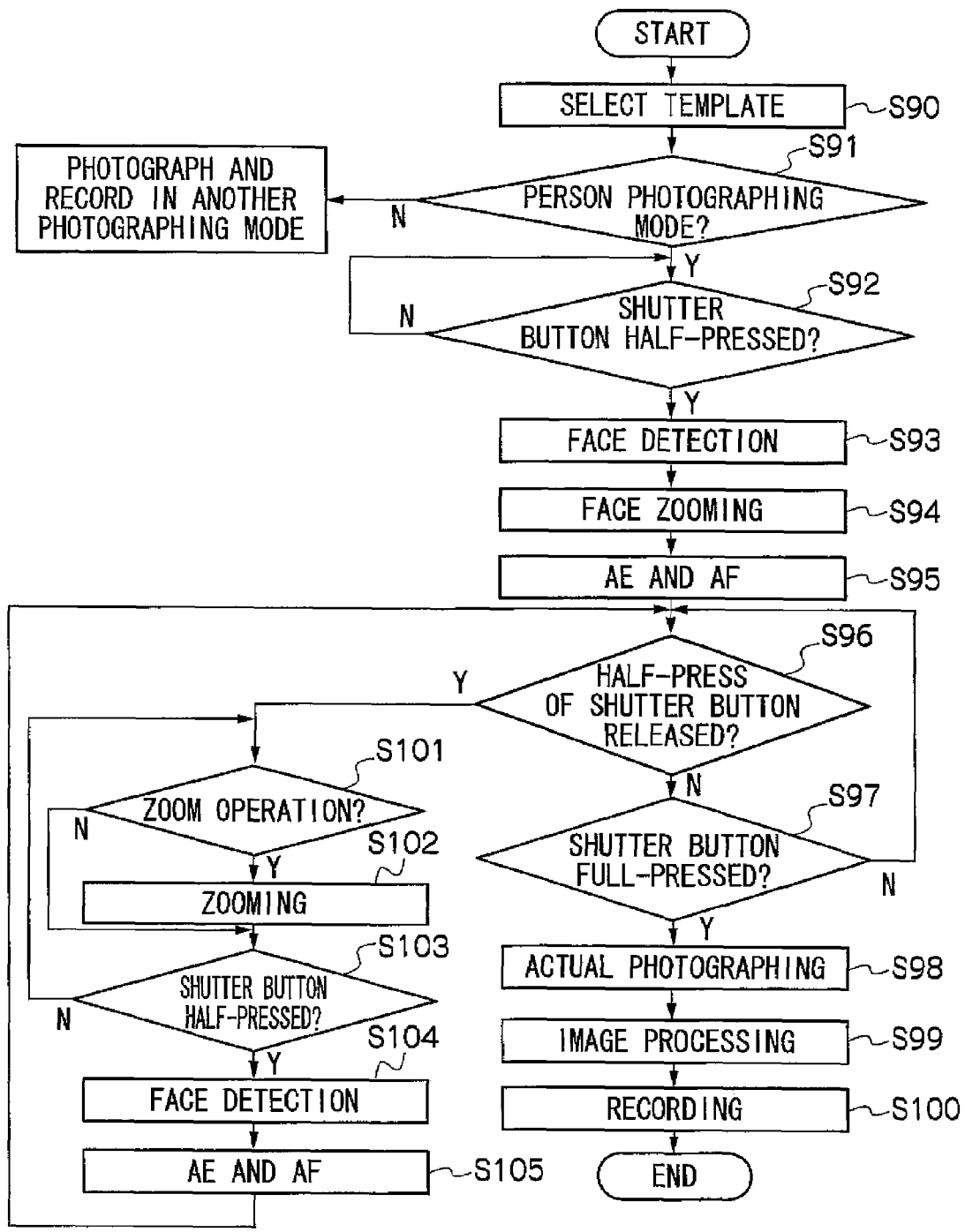
FIG. 10 is a flow chart of the procedure of operations when using a template to zoom the face.

FIG. 10 is a flow chart of the procedure of operations when using a template to zoom the face.

The user first selects a template for use in the person photographing mode (step S90).

The template is selected on the menu screen in the electronic camera of the present embodiment. In other words, an item for selecting a template is prepared in one of the menu items, and the template can be selected when the item is selected.

As for the specific selection process of the template, available templates are sequentially displayed or a list is displayed on the monitor 28 as shown in FIG. 9 to make the user select a template for use. For example, the cross button 36, the MENU/OK button 38, and the like are used for the selection operation.

It is assumed that a plurality of templates are prepared and stored, for example, in the EEPROM 118 or the ROM 114.

The CPU 110 determines whether the photographing mode is set to the person photographing mode based on the setting condition of the camera (step S91). If a mode other than the person photographing mode is set, the process according to the set mode is conducted.

On the other hand, if the CPU 110 determines that the person photographing mode is set, the CPU 110 determines whether the shutter button 22 is half-pressed based on the input from the operation unit 112 (step S92). If the CPU 110 determines that the shutter button 22 is half-pressed, the face detection is conducted (step S93). More specifically, the images obtained for the through display are added to the face detection unit 164 to detect the face of the person. The position and the size of the face of the person in the image are calculated based on the detection result of the face detection unit 164. The face is zoomed such that the face of the person in the photographic image is photographed in the same size as the size of the face of the person in the selected template (step S94).

The face is zoomed, for example, in the following manner. The face is gradually zoomed in predetermined steps, and in each step, the face detection unit 164 detects the face. The zooming stops when the detected face reaches the size of the face of the person in the selected template. This allows the size of the face of the person in the image captured by the imaging element 128 to be adapted to the size of the face of the person in the template.

After zooming the face this way to make the face of the person in the image to be the same size as the size of the face of the person in the template, the CPU 110 conducts the AE and AF processes. More specifically, the CPU 110 brings the person in the image into focus and determines the exposure value so that the face of the person in the image has an appropriate brightness (step S95).

Subsequently, the CPU 110 determines whether the half-press of the shutter button 22 is released based on the input from the operation unit 112 (step S96). If the CPU 110 determines that the half-press of the shutter button 22 is not released, the CPU 110 determines whether the shutter button 22 is full-pressed based on the input from the operation unit 112 (step S97).

If CPU 110 determines that the shutter button 22 is full-pressed, the actual photographing is conducted (step S98). The image obtained by photographing is subjected to image processing suitable for the person photographing (step S99) and recorded in the memory card 146 (step S100).

On the other hand, if the CPU 110 determines that the half-press of the shutter button 22 is released at step S96, the CPU 110 determines whether the zoom operation is conducted based on the input from the operation unit 112 (step S101). If the CPU 110 determines that the zoom operation is conducted, the zooming is controlled based on the operation amount (step S102).

The CPU 110 again determines whether the shutter button 22 is half-pressed based on the input from the operation unit 112 (step S103). If the CPU 110 determines that the shutter button 22 is half-pressed, the face detection is conducted (step S104), and the AE and AF processes are conducted based on the detection result (step S105). More specifically, the CPU 110 brings the detected person into focus and determines the exposure value so that the face of the person in the image has an appropriate brightness.

After the AE and AF processes, the CPU 110 returns to step S96 and again determines whether the half-press of the shutter button 22 is released based on the input from the operation unit 112 (step S96). If the CPU 110 determines that the half-press of the shutter button 22 is not released, the CPU 110 determines whether the shutter button 22 is full-pressed based on the input from the operation unit 112 (step S97). If the CPU 110 determines that the shutter button 22 is full-pressed, the actual photographing is conducted (step S98).

A plurality of templates with different sizes of faces may be prepared (see, FIG. 9) in this way to make the user select a template to thereby set the size of the face of the person subject to the face zooming.

The templates may be displayed on top of each other as through-the-lens images or may not be displayed. The user may be able to select the display/nondisplay.

In the above example, although fine adjustment of the composition by user's zoom operation is possible after the face zooming, the fine adjustment of the composition by the user's zoom operation may be made impossible, and the zooming may be conducted such that the face of the person always becomes the same as the size of the face of the selected template.

Figure 11:
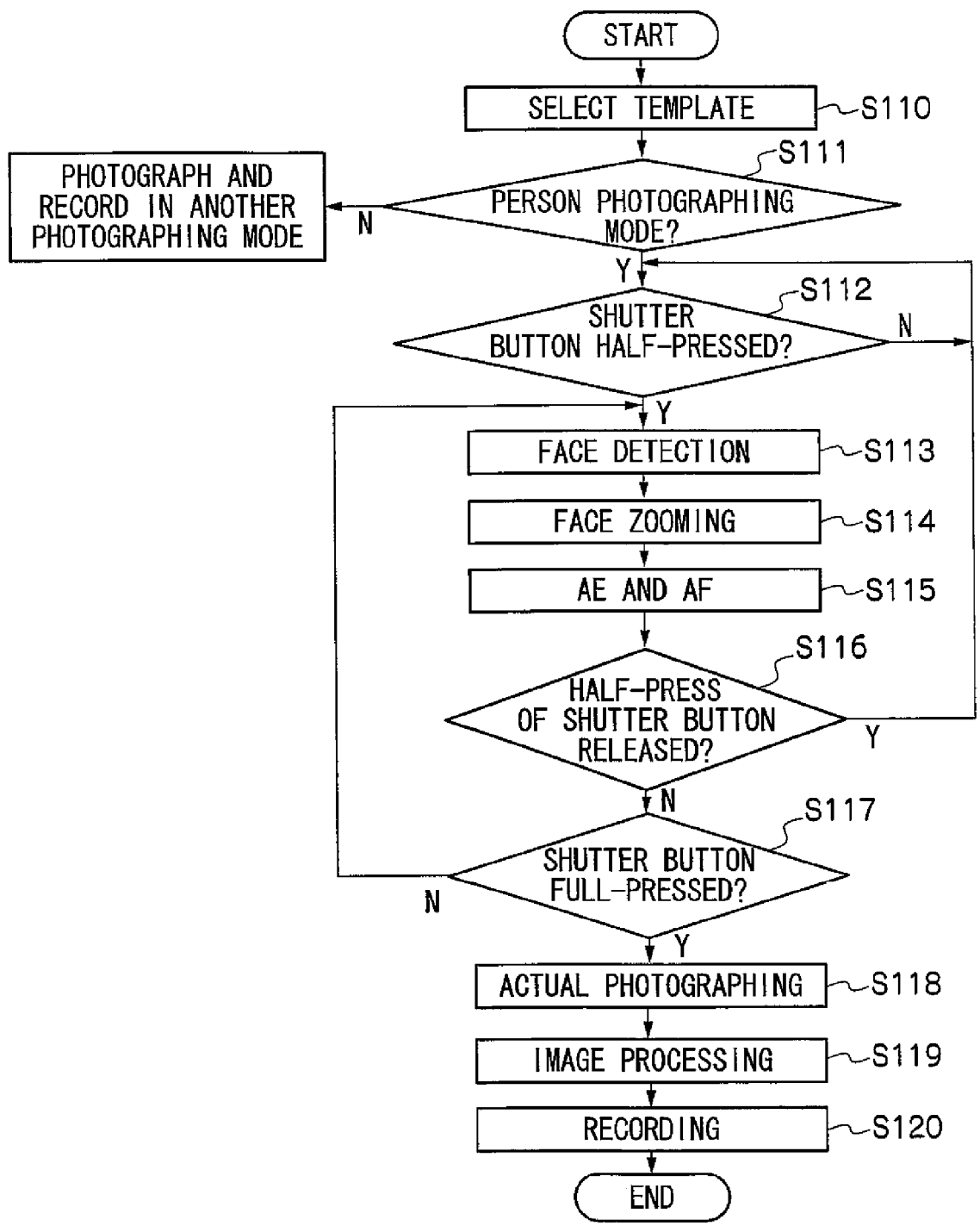
FIG. 11 is a flow chart of the procedure of operations in which a zooming process is always conducted such that the face of the person becomes the size of the face of the person in the selected template.

FIG. 11 is a flow chart of the procedure of operations in which a zooming process is always conducted such that the face of the person becomes the size of the face of the person in the selected template.

The user first selects a template for use in the person photographing mode (step S110).

The CPU 110 determines whether the photographing mode is set to the person photographing mode based on the setting condition of the camera (step S111). When a mode other than the person photographing mode is set, the process according to the set mode is conducted.

On the other hand, if the CPU 110 determines that the person photographing mode is set, the CPU 110 determines whether the shutter button 22 is half-pressed based on the input from the operation unit 112 (step S112). If the CPU 110 determines that the shutter button 22 is half-pressed, the face detection is conducted (step S113). More specifically, the images obtained for the through display are added to the face detection unit 164 to detect the face of the person. The position and the size of the face of the person in the image are calculated based on the detection result of the face detection unit 164. The face zooming is conducted such that the face of the person in the photographic image is photographed in the same size as the size of the face of the person in the selected template (step S114).

The CPU 110 then conducts the AE and AF processes. More specifically, the CPU 110 brings the person in the image into focus and determines the exposure value such that the face of the person in the image has an appropriate brightness (step S115).

Subsequently, the CPU 110 determines whether the half-press of the shutter button 22 is released based on the input from the operation unit 112 (step S116). If the CPU 110 determines that the half-press of the shutter button 22 is not released, the CPU 110 determines whether the shutter button 22 is full-pressed based on the input from the operation unit 112 (step S117).

If the CPU 110 determines that the shutter button 22 is not full-pressed, the CPU 110 returns to step S113 and again detects the face (step S113), zoom the face (step S114), and conducts the AE and AF processes (step S115).

On the other hand, if the CPU 110 determines that the shutter button 22 is full-pressed, the actual photographing is conducted (step S118). The image obtained by photographing is subjected to image processing suitable for the person photographing (step S119) and recorded in the memory card 146 (step S120).

In this manner, the zooming may be performed such that the face of the person always becomes the same size as the face of the selected template during the half-press of the shutter button 22. This enables to easily and quickly photograph an image in a user's desired composition.

In the above example, although the zooming is conducted such that the face of the person always becomes the same as the size of the face in the template when the shutter button 22 is half-pressed, the face may be always zoomed regardless of the half-press of the shutter button 22.

Figure 12:
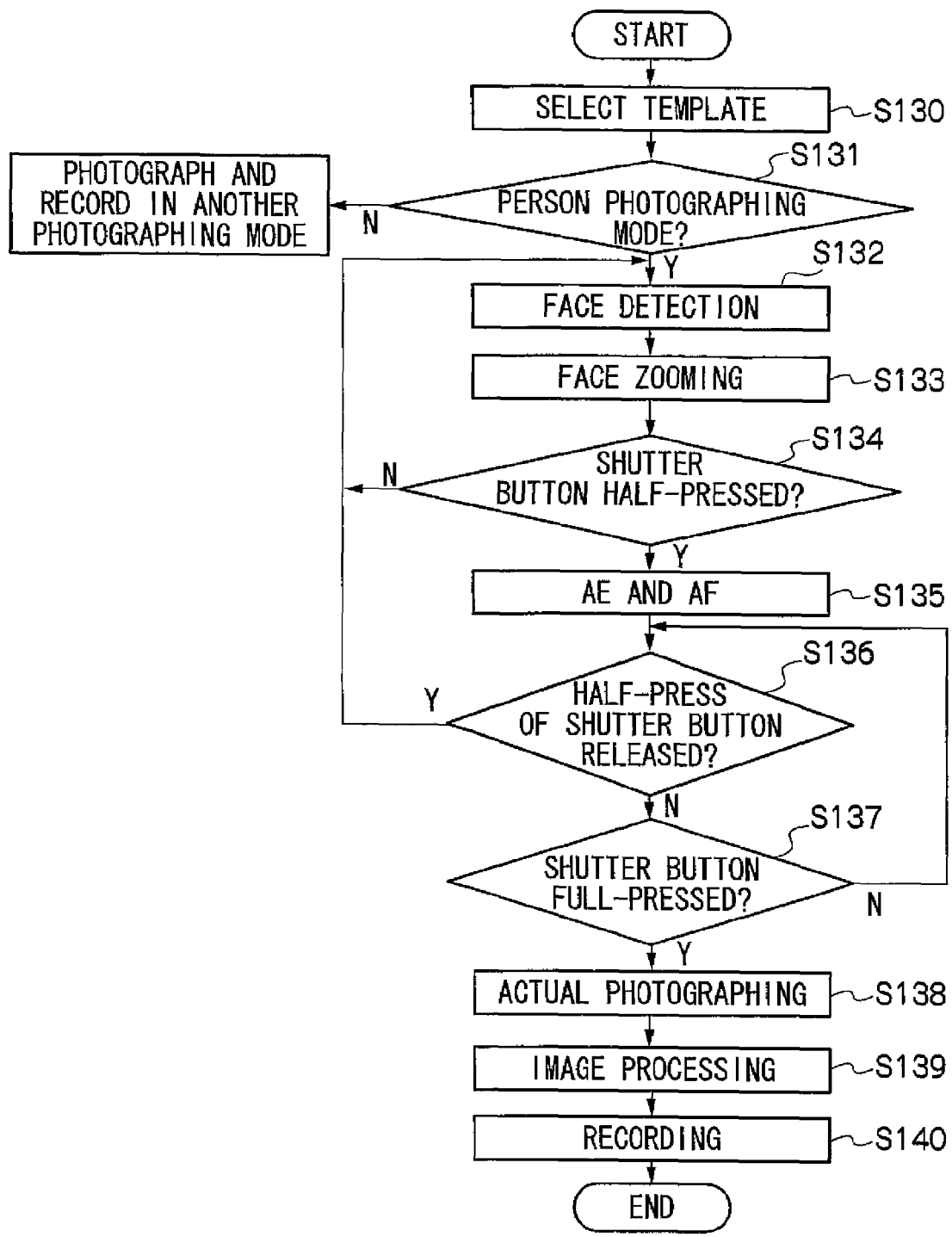
FIG. 12 is a flow chart of the procedure of operations in which a zooming process is conducted such that the face of the person always becomes the size of the face of the person in the selected template.

FIG. 12 is a flow chart of the procedure of operations in which a zooming process is conducted such that the face of the person always becomes the size of the face of the person in the selected template.

The user first selects a template for use in the person photographing mode (step S130).

The CPU 110 determines whether the photographing mode is set to the person photographing mode based on the setting condition of the camera (step S131). When a mode other than the person photographing mode is set, the process according to the set mode is conducted.

On the other hand, if the CPU 110 determines that the person photographing mode is set, the CPU 110 detects the face (step S132). More specifically the images obtained for the through display are added to the face detection unit 164 to detect the face of the person. The position and the size of the face of the person in the image are calculated based on the detection result of the face detection unit 164. The face is zoomed such that the face of the person in the photographic image is photographed in the same size as the size of the face of the person in the selected template (step S133).

The CPU 110 then determines whether the shutter button 22 is half-pressed based on the input from the operation unit 112 (step S134). If the CPU 110 determines that the shutter button 22 is half-pressed, the CPU 110 conducts the AE and AF processes (step S135). More specifically, the CPU 110 brings the person in the image into focus and determines the exposure value so that the face of the person in the image has an appropriate brightness.

Subsequently, the CPU 110 determines whether the half-press of the shutter button 22 is released based on the input from the operation unit 112 (step S136). If the CPU 110 determines that the half-press of the shutter button 22 is not released, the CPU 110 determines whether the shutter button 22 is full-pressed based on the input from the operation unit 112 (step S137).

If the CPU 110 determines that the shutter button 22 is not full-pressed, CPU 110 returns to step S136 and again determines whether the half-press of the shutter button 22 is released (step S136).

On the other hand, if the CPU 110 determines that the shutter button 22 is full-pressed, the CPU 110 conducts the actual photographing (step S138). The image obtained by photographing is subjected to image processing suitable for the person photographing (step S139) and recorded in the memory card 146 (step S140).

In this manner, the zooming may be performed such that the face of the person always becomes the same size as the face of the selected template until the shutter button 22 is half-pressed. This enables to easily and quickly photograph an image in a user's desired composition.

In the above example, although the user selects one of a plurality of prepared templates to set the size of the face of the person subject to the face zooming, it may be designed that the size of the face of the person in one template is arbitrarily changed within the template to set the size of the face of the person subject to the face zooming.

More specifically, for example, an item for setting the position and the size of the person in the template is prepared in one of the menu items, and once the item is selected on the menu screen, the position and the size of the face of the person in the template can be arbitrarily set.

Figure 13A:
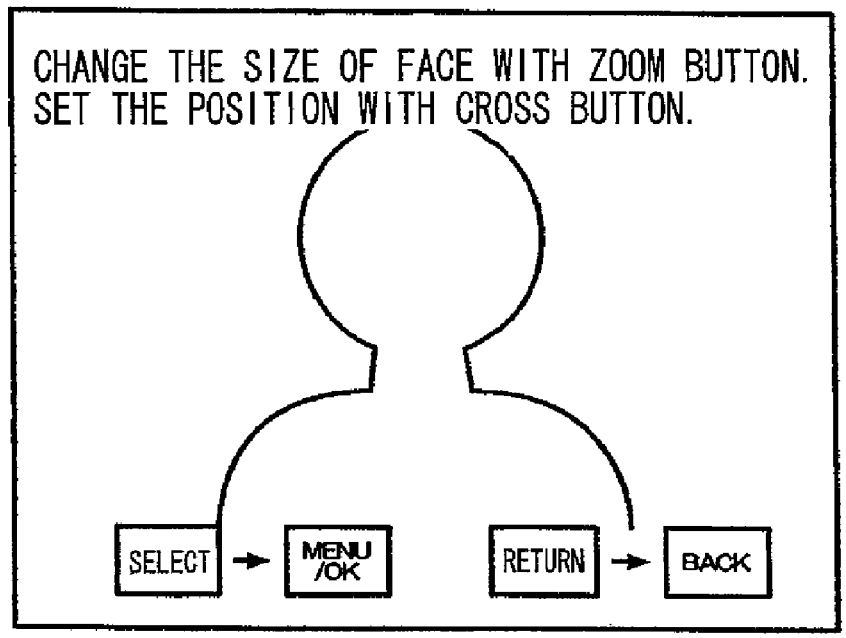
FIGS. 13A and 13B depict one example of a method of arbitrarily setting the position and the size of the face of a person in a template on the screen of the monitor.
Figure 13B:
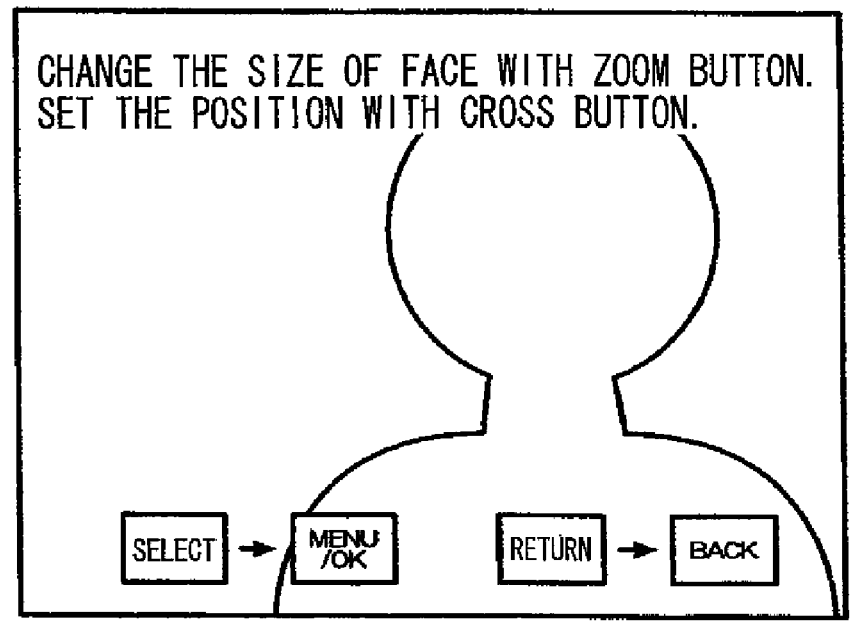

A specific setting method is shown in FIG. 13 in which a template with a frame of a person is shown on the screen of the monitor. The size of the frame is adjusted by operation of the zoom button, while the position of the frame is adjusted by operation of the cross button.

This enables to easily and quickly photograph an image of a person in a user's desired composition.

In photographing using the series of templates, the size of the face of a person may be detected from the position of the focus lens in focus and the position of the zoom lens instead of using the result of the so-called face recognition.

A second embodiment of the electronic camera of the present invention will now be described.

Although the process of automatically zooming the face of a person when photographing one person as a main object is described in the first embodiment, the process of photographing a plurality of persons will be described in this embodiment. In other words, operations of photographing a group photo will be described.

When photographing a group photo, the electronic camera of the present embodiment is automatically zoomed such that the persons to be photographed are shown full screen. More specifically, when photographing a plurality of persons (three in FIG. 14A) as objects as shown in FIG. 14A, automatic zooming (face zooming) is conducted such that the faces of the persons as objects are shown full screen as shown in FIG. 14B.

The configuration itself of the camera is the same as the electronic camera 10 of the first embodiment, and thus, only the operations in photographing a group photo will be described herein.

The face zooming in a group photo is conducted by setting the photographing mode of the camera to the group photo photographing mode.

FIG. 15 is a flow chart of the procedure of operations of photographing and recording by the electronic camera 10 in the group photo photographing mode.

The CPU 110 determines whether the photographing mode is set to the group photo photographing mode based on the setting condition of the camera (step S150).

The setting of the group photo photographing mode is conducted by selecting an item for setting the AE mode and the scene program AE on the menu screen, then setting the AE mode to the "scene program AE" on the screen for setting the AE mode and the scene program AE, and setting the scene program AE to the "group photo photographing mode".

As described, the setting condition of the camera is recorded in the EEPROM 118. The CPU 110 reads out the information recorded in the EEPROM 118 and determines whether the current photographing mode is set to the group photo photographing mode.

A button, a dial, or the like exclusively used for setting the group photo photographing mode may be prepared to set the group photo photographing mode with these operation buttons or the like.

When the CPU 110 determines that a mode other than the group photo photographing mode is set, the process according to the set mode is conducted.

On the other hand, if the CPU 110 determines that the group photo photographing mode is set, the CPU 110 determines whether the shutter button 22 is half-pressed based on the input from the operation unit 112 (step S51). If the CPU 110 determines that the shutter button 22 is half-pressed, the face detection is conducted (step S152).

More specifically, the images obtained for the through display are added to the face detection unit 164 to detect the faces of the persons. The positions and the sizes of the faces of the persons in the image are calculated based on the detection result of the face detection unit 164, and the faces are zoomed so that the faces of the persons in the image are photographed full screen (step S153).

The face is zoomed, for example, in the following manner. The faces are gradually zoomed in predetermined steps, and in each step, the face detection unit 164 detects the faces. The zooming stops when the detected faces have become full screen (to the extent that the faces do not extend beyond the screen). This allows the sizes of the faces of the persons in the image captured by the imaging element 128 to be shown full screen.

After zooming the faces this way to make the faces of the persons in the image to be shown full screen, the CPU 110 conducts the AE and AF processes, brings the persons in the image into focus, and determines the exposure value so that the faces of the persons in the image have an appropriate brightness (step S154). The focusing herein is, for example, conducted to the person nearest to the center, or to the person with the biggest face. The aperture value is set so that the depth of field is deeper than usual.

The CPU 110 then determines whether the half-press of the shutter button 22 is released based on the input from the operation unit 112 (step S155). If the CPU 110 determines that the half-press of the shutter button 22 is not released, the CPU 110 determines whether the shutter button 22 is full-pressed based on the input from the operation unit 112 (step S156). If the CPU 110 determines that the shutter button 22 is full-pressed, the actual photographing is conducted (step S157). The obtained image is subjected to image processing suitable for the person photographing (step S158) and recorded in the memory card 146 (step S159).

On the other hand, if the CPU 110 determines that the half-press of the shutter button 22 is released at step S155, the CPU 110 determines whether the zoom operation is conducted based on the input from the operation unit 112 (step S160). If the CPU 110 determines that the zoom operation is conducted, the CPU 110 controls the zooming based on the operation amount (step S161).

Subsequently, the CPU 110 again determines whether the shutter button 22 is half-pressed based on the input from the operation unit 112 (step S162). If the CPU 110 determines that the shutter button 22 is half-pressed, the face detection is conducted (step S163) and the AE and AF processes are conducted based on the detection result (step S164). More specifically, the CPU 110 brings the persons in the image into focus and determines the exposure value such that the faces of the persons in the image have an appropriate brightness.

After the AE and AF processes, the CPU 110 returns to step S155 and again determines whether the half-press of the shutter button 22 is released based on the input from the operation unit 112 (step S155). If the CPU 110 determines that the half-press of the shutter button 22 is not released, the CPU 110 determines whether the shutter button 22 is full-pressed based on the input from the operation unit 112 (step S156). If the CPU 110 determines that the shutter button 22 is full-pressed, the actual photographing is conducted (step S157). The obtained image is subjected to image processing suitable for the person photographing (step S158) and recorded in the memory card 146 (step S159).

As mentioned, in the electronic camera 10 of the present embodiment, the first half-press of the shutter button 22 automatically zooms the faces (face zooming) such that the faces of the persons to be photographed are shown full screen. This enables to easily and quickly photograph a group photo in which the faces of persons have appropriate sizes.

If modification of the composition is desired when the automatic zooming is performed, zooming after the release of the half-press of the shutter button 22 allows easy modification of the composition, thereby enabling to easily photograph an image in a composition desired by the photographer.

An image in a photographer's desired composition can quickly taken because only a small adjustment is required in this adjustment operation, preventing missing an opportunity to press the shutter.

The electronic camera 10 of the present embodiment is user-friendly, allowing quick zooming of the faces of the persons, because the faces are zoomed in response to the half-press of the shutter button 22.

As in the case of the person photographing mode, an instruction button (face zooming button) for zooming the faces may be additionally arranged on the camera body 12 to zoom the faces when the face zooming button is pressed in the group photo photographing mode (see, FIG. 5).

As in the case of the person photographing mode, the faces may be zoomed until the shutter button 22 is half-pressed once the group photo photographing mode is set (see, FIG. 6).

In the above example, although the user can finely adjust the zoom position after the face zooming, the fine adjustment may be made impossible such that the face zooming is always conducted. More specifically, the zooming process may be designed in such a manner that the faces are always zoomed after the half-press of the shutter button 22 so that the faces of the persons in the image are always shown full screen. The zooming process may also be designed in such a manner that the faces are always zoomed regardless of the half-press of the shutter button 22 so that the faces of the persons in the image are always shown full screen.

In the above example, although the face detection is conducted in conjunction with the face zooming or the AE and AF control, the face detection may be conducted arbitrarily. More specifically, the face detection may be conducted sequentially or at constant time intervals to the image obtained for the through display. During the face zooming, the detection result may be arbitrarily used for the face zooming.

In the above example, although the zooming is controlled such that the faces of the persons are photographed full screen during the face zooming, it is preferable that the user can arbitrarily set the range of illustrating the faces. For example, an item for setting the range of illustrating the faces of the persons in the group photo photographing mode is prepared as one of the menu items, and once this setting item is selected, the range of illustrating the faces of the persons can be arbitrarily set on the screen of the monitor 28, as shown in FIGS. 16A and 16B.

Figure 16A:
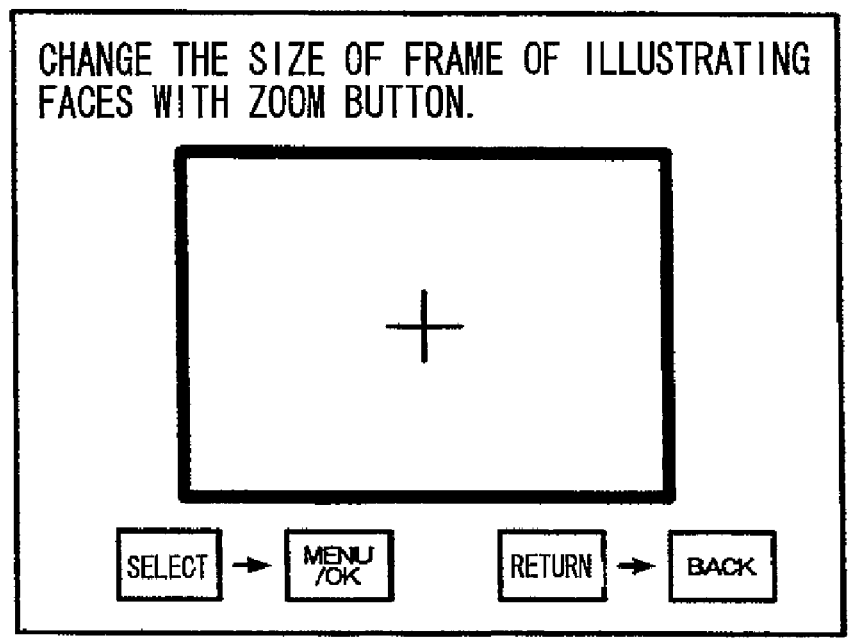
FIGS. 16A and 16B depict one example of a method of setting the range of illustrating the faces of persons on the screen of the monitor.

In the example shown in FIG. 16A, a frame indicating the range of illustrating the faces of the persons is shown on the screen of the monitor 28, and the size of the frame is designed to be expanded and contracted with the zoom button.

Figure 16B:
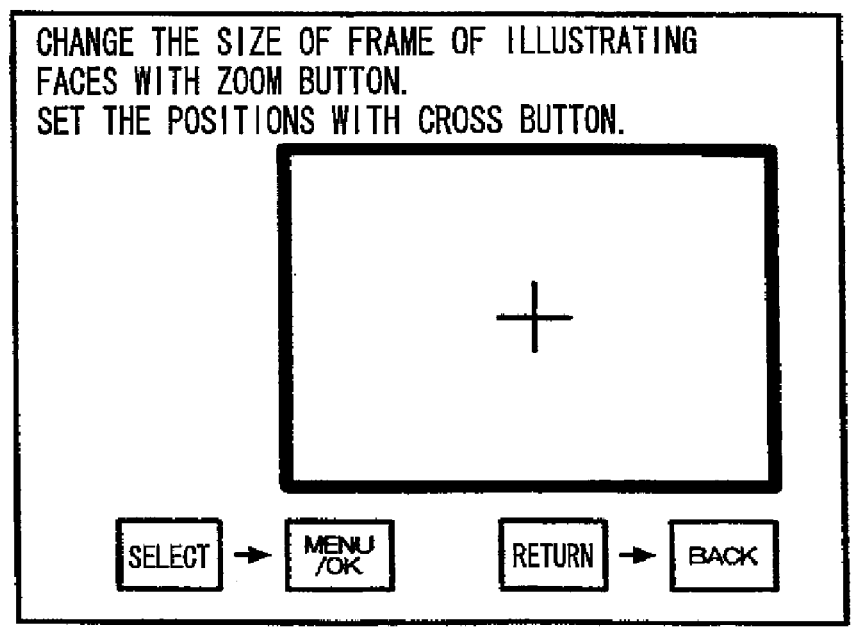
Figure 17A:
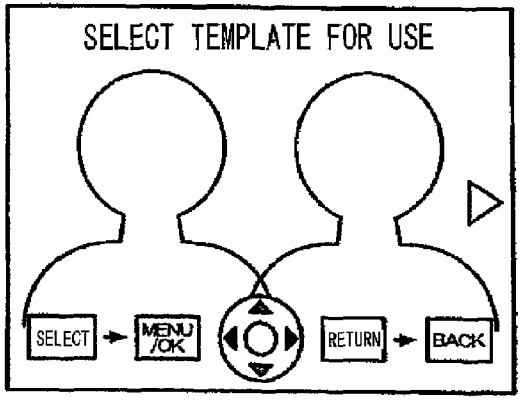
FIGS. 17A to 17F depict one example of templates for use in the group photo photographing mode.
Figure 17B:
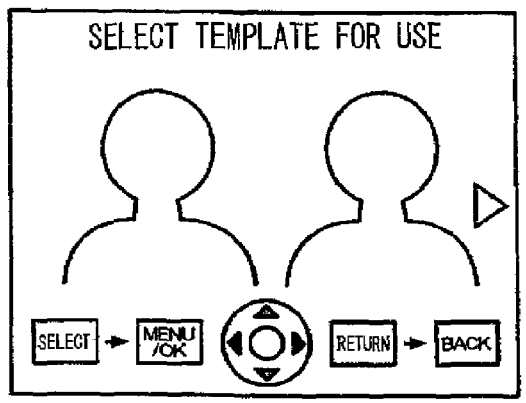
Figure 17C:
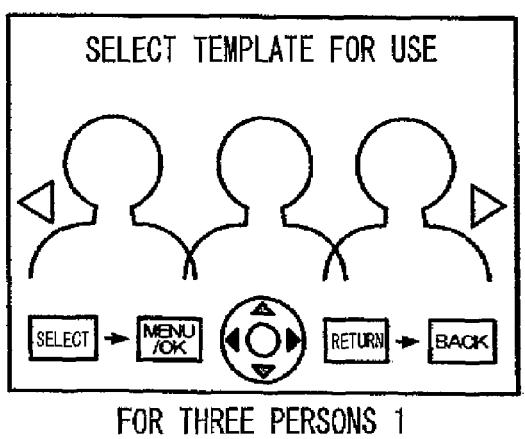
Figure 17D:
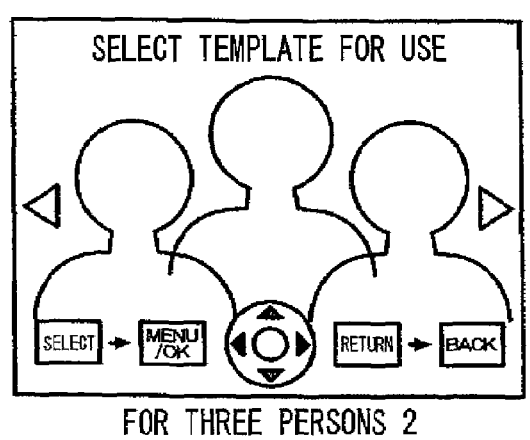
Figure 17E:
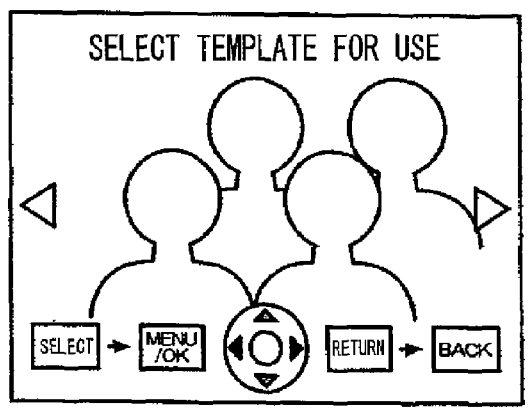
Figure 17F:
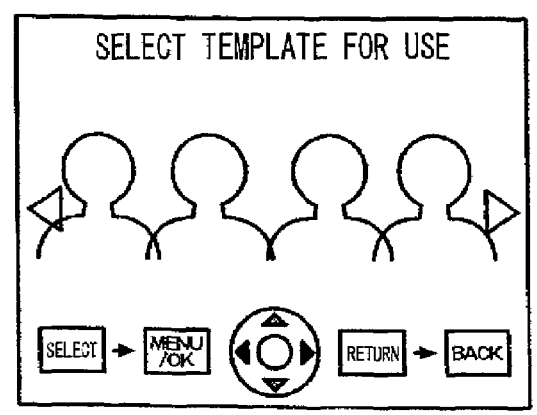

In the example of FIG. 16B, a frame indicating the range of illustrating the faces of the persons on the screen of the monitor 28 is shown. The size of the frame is designed to be expanded and contracted with the zoom button, while the position of the frame is designed to be set with the cross button.

When setting the size of the frame for illustrating the faces of the persons, user's photographing results of group photos of the past may be reflected to automatically set the size of the frame. More specifically, as in the case of automatically setting the size of the face of the person subject to the face zooming by figuring out the tendency of the face size setting from the photographing results of the past in the person photographing mode, the size of the frame high in the setting frequency may be automatically set by figuring out the user's tendency of the frame size setting from the user's photographing results of group photos of the past.

A template may be used for zooming the faces in accordance with the template, instead of zooming the faces in accordance with the screen or the frame. More specifically, for example, a plurality of templates with different distributions (positions and sizes) of faces for each of the numbers of persons photographed are prepared as shown in FIG. 17, and the user is made to select a template for use. During the face zooming, the zooming is controlled so that the distribution becomes substantially the same as the distribution of the faces of the persons in the selected template.

Figure 18:
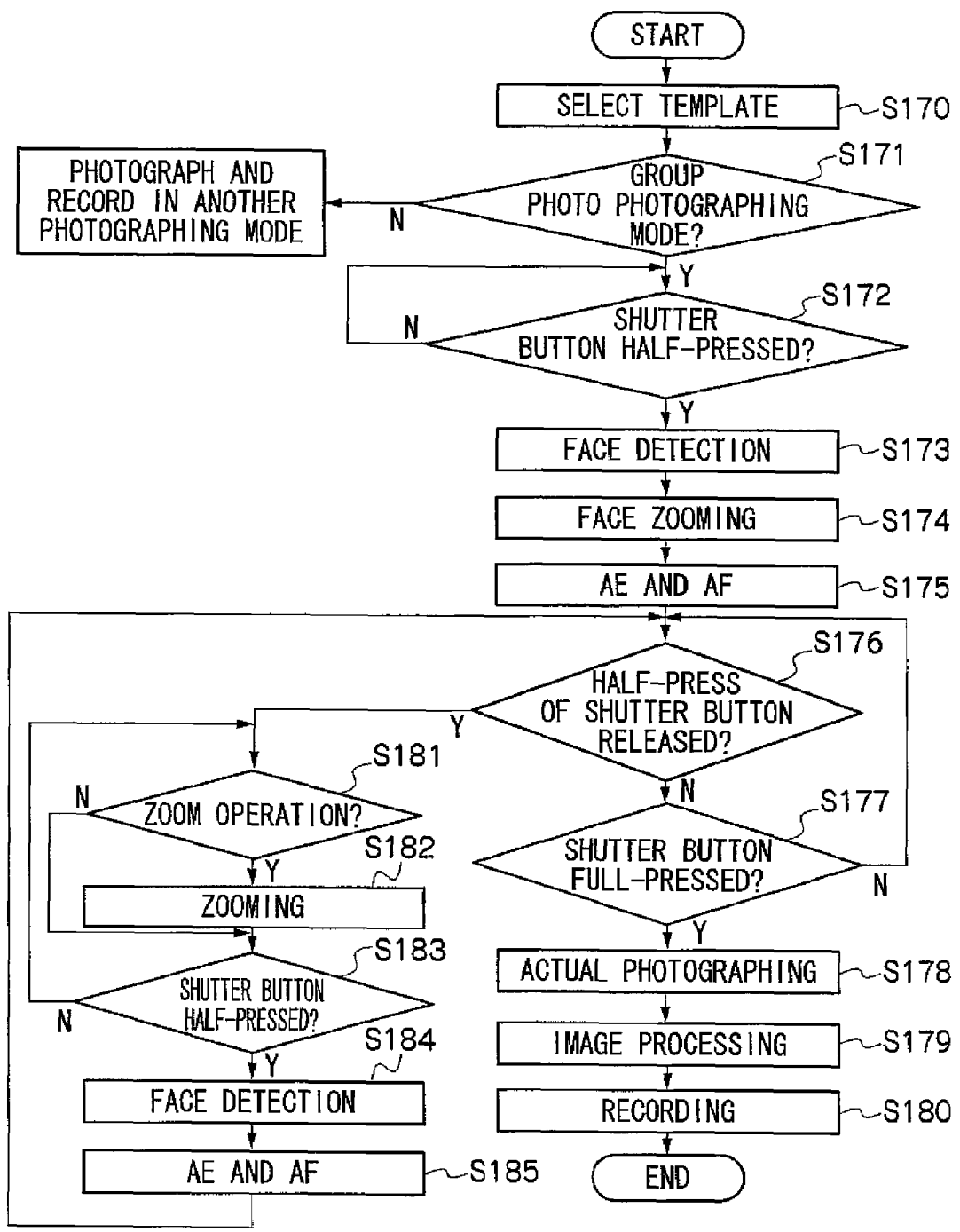
FIG. 18 is a flow chart of the procedure of operations when zooming the faces in a group photo using a template.

FIG. 18 is a flow chart of the procedure of operations when zooming the faces in a group photo using a template.

The user first selects a template for use in the group photographing mode (step S170).

The template is selected on the menu screen in the electronic camera of the present embodiment. In other words, an item for selecting a template is prepared as one of the menu items, and the template can be selected when the item is selected.

As for the specific selection process of the template, available templates are sequentially displayed or a list is displayed on the monitor 28 as shown in FIG. 17 to make the user select a template for use. For example, the cross button 36, the MENU/OK button 38, and the like are used for the selection operation.

It is assumed that a plurality of templates are prepared and stored, for example, in the EEPROM 118 or the ROM 114.

The CPU 110 determines whether the photographing mode is set to the group photo photographing mode based on the setting condition of the camera (step S171). When a mode other than the group photo photographing mode is set, the process according to the set mode is conducted.

On the other hand, if the CPU 110 determines that the group photo photographing mode is set, the CPU 110 determines whether the shutter button 22 is half-pressed based on the input from the operation unit 112 (step S172). If the CPU 110 determines that the shutter button 22 is half-pressed, the face detection is conducted (step S173). More specifically, the images obtained for the through display are added to the face detection unit 164 to detect the faces of the persons. The positions and the sizes of the faces of the persons in the image are calculated based on the detection result of the face detection unit 164. The faces are zoomed such that the faces of the persons in the photographic image have substantially the same distribution of the faces of the persons in the selected template (step S174).

The faces are zoomed, for example, in the following manner. The faces are gradually zoomed in predetermined steps, and in each step, the face detection unit 164 detects the faces. The zooming stops when the detected faces have substantially the same distribution of the faces of the persons in the selected template. This allows the distribution of the faces of the persons in the image captured by the imaging element 128 to be adapted to the distribution of the faces of the persons in the template.

The distribution of the faces of the persons is adapted to the distribution of the faces of the persons in the template in this way. Thus, the persons as objects are photographed side by side in substantially the same alignment as the persons in the template.

After zooming the faces to make the faces of the persons in the image to have substantially the same distribution of the faces of the persons in the template, the CPU 110 conducts the AE and AF processes. More specifically, the CPU 110 brings the persons in the image into focus and determines the exposure value so that the faces of the persons in the image have an appropriate brightness (step S175).

The CPU 110 then determines whether the half-press of the shutter button 22 is released based on the input from the operation unit 112 (step S176). If the CPU 110 determines that the half-press of the shutter button 22 is not released, the CPU 110 determines whether the shutter button 22 is full-pressed based on the input from the operation unit 112 (step S177).

If the CPU 110 determines that the shutter button 22 is full-pressed, the CPU 110 conducts the actual photographing (step S178). The image obtained by photographing is subjected to image processing suitable for the person photographing (step S179) and recorded in the memory card 146 (step S180).

On the other hand, if the CPU 110 determines that the half-press of the shutter button 22 is released at step S176, the CPU 110 determines whether the zoom operation is conducted based on the input from the operation unit 112 (step S181). If the CPU 110 determines that the zoom operation is conducted, the zooming is controlled based on the operation amount (step S182).

Subsequently, the CPU 110 again determines whether the shutter button 22 is half-pressed based on the input from the operation unit 112 (step S183). If the CPU 110 determines that the shutter button 22 is half-pressed, the face detection is conducted (step S184), and the AE and AF processes are conducted based on the detection result (step S185). More specifically, the CPU 110 brings the detected persons into focus and determines the exposure value such that the faces of the persons in the image have an appropriate brightness.

After the AE and AF processes, the CPU 110 returns to step S176 and again determines whether the half-press of the shutter button 22 is released based on the input from the operation unit 112 (step S176). If the CPU 110 determines that the half-press of the shutter button 22 is not released, the CPU 110 determines whether the shutter button 22 is full-pressed based on the input from the operation unit 112 (step S177). If the CPU 110 determines that the shutter button 22 is full-pressed, the actual photographing is conducted (step S178).

A plurality of templates with different distributions (positions and sizes) of faces may be prepared in this manner for each of the numbers of faces (see, FIG. 17). The user is made to select a template, and the automatic zooming is conducted so as to adapt to the distribution of the faces of the persons in the selected template. This enables to easily and quickly photograph an image in a desired composition.

The templates may be displayed on top of each other as through-the-lens images or may not be displayed. The user may be able to select the display/nondisplay.

In the above example, although fine adjustment of the composition by user's zoom operation is possible after the face zooming, the fine adjustment of the composition by the user's zoom operation may be made impossible, and the zooming may be conducted such that the distribution of the faces of the persons always becomes substantially the same as the distribution of the faces of the selected template (see, FIG. 11).

In this case, the zooming may be conducted such that the distribution of the faces of the persons is always substantially the same as the distribution of the faces of the persons in the template when the shutter button 22 is half-pressed, or the faces may be zoomed such that the distribution of the faces of the persons is always substantially the same as the distribution of the faces of the persons in the template regardless of the half-press of the shutter button 22 (see, FIG. 12).

In the above example, although the user selects one from the plurality of prepared templates and automatic zooming is performed for adapting to the distribution of the faces of the persons in the template, the method of setting the template for use is not limited to this. For example, a template for use may be set by preparing templates for each of the numbers of persons, thereby allowing an arbitrary change in the positions and the sizes of the faces of the persons in the template.

More specifically, for example, an item for setting the positions and the sizes of the persons in the template is prepared in one of the menu items, and once the item is selected on the menu screen, the positions and the sizes of the persons in the template can be arbitrarily set.

Figure 19A:
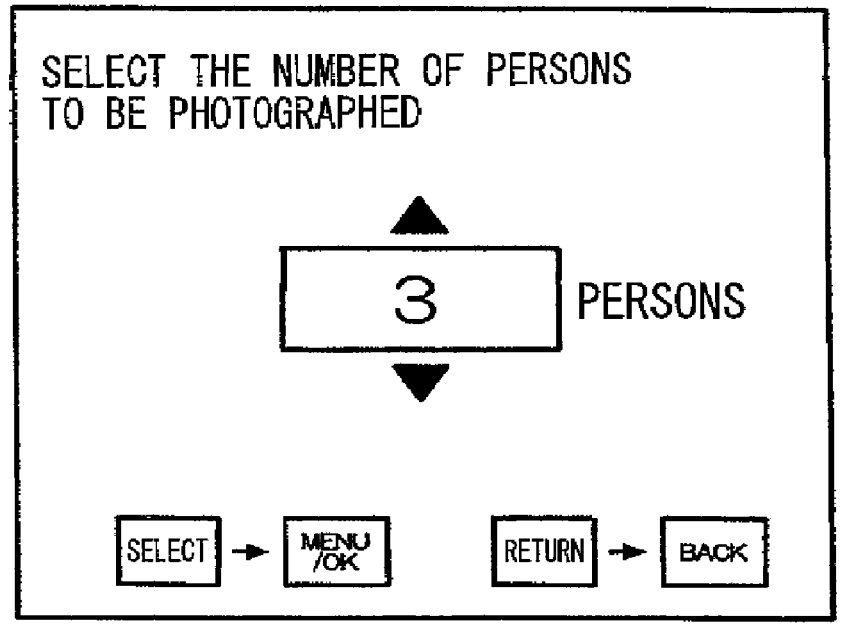
FIGS. 19A and 19B are one example of a method of arbitrarily setting the positions and the sizes of the faces of persons in a template on the screen of the monitor.
Figure 19B:
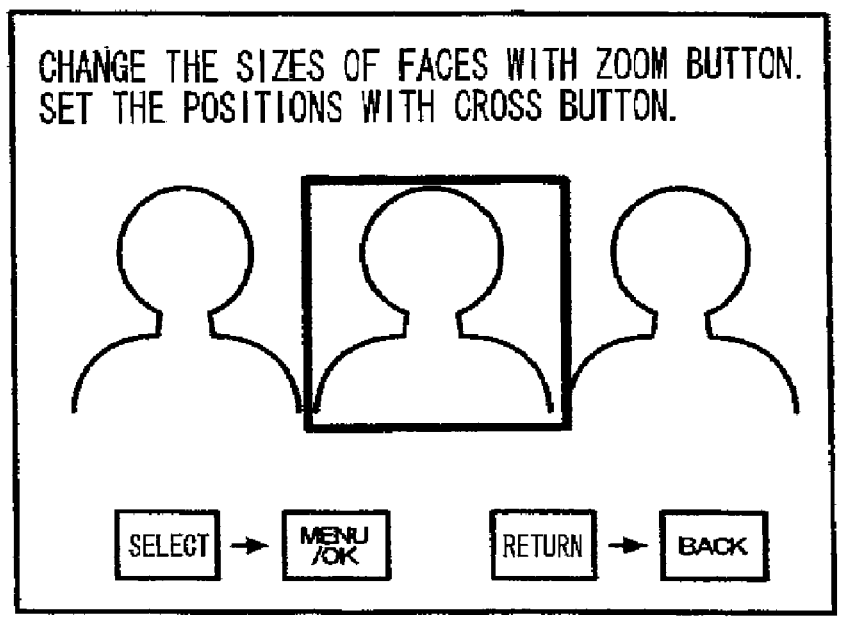

A specific setting method is shown as an example in FIG. 19A in which the number of persons to be photographed is first selected. Then, a template corresponding to the selected number of persons is shown on the screen of the monitor as shown in FIG. 19B, and the size of the frame of each person is adjusted with the zoom button, while the position is adjusted with the cross button.

Enabling to change the distribution of the persons in the template in accordance with the user's preference allows easy and quick photographing of a group photo in a user's desired composition.

When adapting the distribution of the faces of the persons to be photographed to the distribution of the faces of the persons in the template, the zooming may be conducted so that only the sizes of the faces are adapted to the sizes of the faces of the persons in the template. In other words, after detecting the positions and the sizes of the faces of the persons in the image by the face detection, the zooming may be conducted such that the sizes of the detected faces of the persons substantially match with the sizes of the faces of the persons in the template. In this case, the sizes of the faces may be found from the position of the focus lens in focus and the position of the zoom lens to conduct the zooming process based on the result, instead of using the result of the so-called face recognition. The face detection unit does not have to be particularly provided when using this method.

In the above example, the mode of the camera is set to the group photo mode for zooming the faces during the group photo. However, when the person photographing mode is set, the mode may be automatically switched to the group photo photographing mode if a plurality of persons are detected. In other words, in the person photographing mode, the processes in the person photographing mode are implemented when only one main object is detected as a result of the face detection. When a plurality of persons are detected, the processes in the group photo photographing mode are implemented. This allows arbitrary, optimal zooming in accordance with the number of persons photographed.

Although so-called optical zooming is performed in the first and second embodiments, so-called electronic zooming may be performed. Both of the electronic zooming and the optical zooming may also be performed.

A third embodiment of the electronic camera of the present invention will now be described.

Figure 20A:
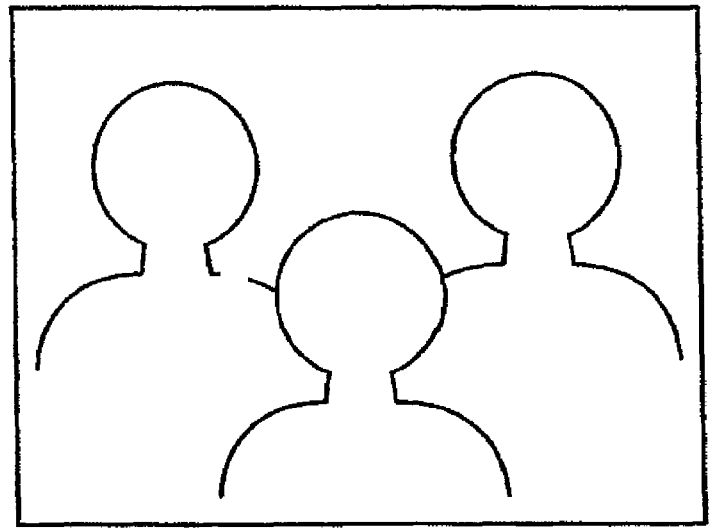
FIGS. 20A to 20C are schematic diagrams of the process in the group photo photographing mode of the electronic camera according to a third embodiment.
Figure 20B:
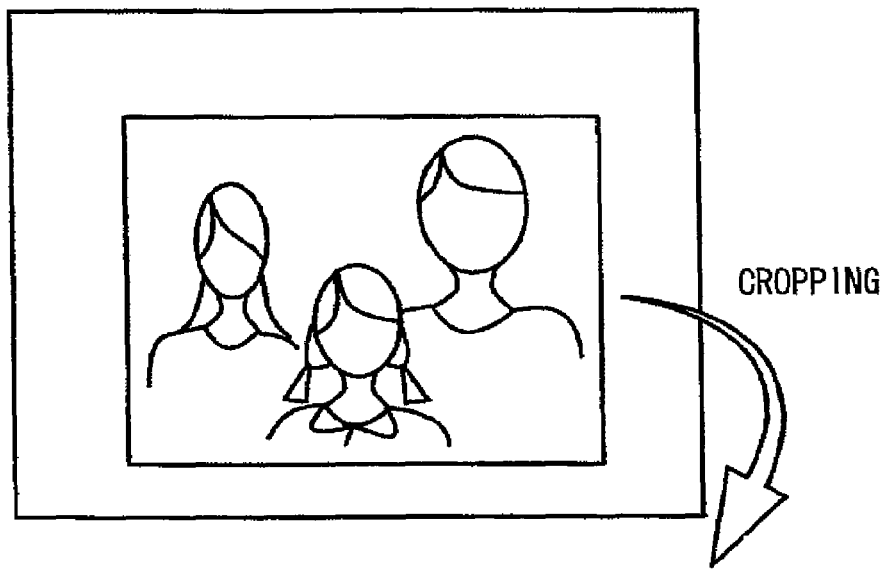
Figure 20C:
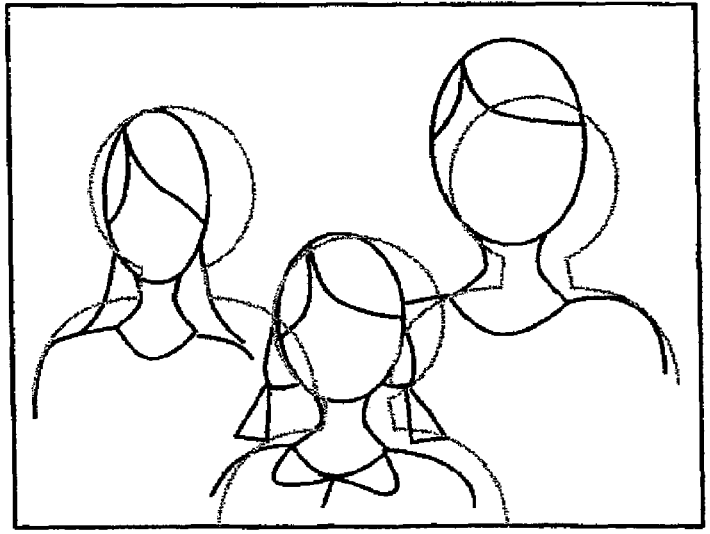

In the second embodiment, a template is elected, and automatic zooming is conducted to adapt to the distribution of the persons in the template to thereby obtain an image in a predetermined composition. However, in this embodiment, a template is selected, and the image obtained by photographing is automatically cropped after photographing so as to adapt to the distribution of the persons in the template, to thereby obtain an image in a predetermined composition. More specifically, when a template of three persons as shown in FIG. 20A is selected and the image as shown in FIG. 20B is photographed, an image which substantially matches with the composition of the selected template is cut out, as shown in FIG. 20C, from the image obtained by photographing, and this is recorded as a photographic image.

The configuration itself of the camera is the same as the electronic camera 10 of the first embodiment, and thus, only the operations of photographing and recording will be described herein.

FIG. 21 is a flow chart of the procedure of the operations of photographing and recording in the group photo photographing mode of the electronic camera according to the present embodiment.

The user first selects a template for use in the group photographing mode (step S190). The method of selecting the template is the same as the method of selecting a template in the second embodiment.

The CPU 110 determines whether the photographing mode is set to the group photo photographing mode based on the setting condition of the camera (step S191). When a mode other than the group photo photographing mode is set, the process according to the set mode is conducted.

On the other hand, if the CPU 110 determines that the group photo photographing mode is set, the CPU 110 determines whether the shutter button 22 is half-pressed based on the input from the operation unit 112 (step S192). If the CPU 110 determines that the shutter button 22 is half-pressed, the AE and AF processes are conducted (step S193).

The CPU 110 then determines whether the half-press of the shutter button 22 is released based on the input from the operation unit 112 (step S194). If the half-press of the shutter button 22 is released, the CPU 110 returns to the process of step S192 and again detects whether the shutter button 22 is half-pressed.

Meanwhile, if the CPU 110 determines that the half-press of the shutter button 22 is not released, the CPU 110 determines whether the shutter button 22 is full-pressed based on the input from the operation unit 112 (step S195).

If the CPU 110 determines that the shutter button 22 is full-pressed, the CPU 110 conducts the actual photographing (step S196). The faces of the persons are detected from the obtained image (step S197). In other words, the image data obtained by photographing is added to the face detection unit 164 to extract the face area. The positions and the sizes of the faces of the persons in the image are calculated based on the extraction result.

After detecting the faces, the CPU 110 applies image processing suitable for the person photographing to the photographic image based on the result of the face detection (step S198).

The CPU 110 cuts out an image having a composition substantially the same as the distribution of the faces of the persons in the selected template based on the result of the face detection. In other words the cropping process is conducted (step S199).

The image signal processing unit 138 conducts the cropping process based on an instruction from the CPU 110. The CPU 110 calculates the area necessary for cropping from the result of the face detection and provides an instruction of cropping to the image signal processing unit 138. In response to the instruction of cropping from the CPU 110, the image signal processing unit 138 cuts out the designated area from the photographic image and conducts the cropping process.

The cropped image data is recorded in the memory card 146 as a photographic image (step S200). More specifically, the cropped image data is compressed and then recorded in the memory card 146 as an image file in a predetermined form.

As mentioned, in the electronic camera of the present embodiment, the image obtained by photographing is automatically cropped to adapt to the composition of the selected template, and the cropped image is recorded in a memory card as a photographic image. This enables to easily and quickly photograph a group photo in a user's desired composition without cumbersome zoom operation.

In the electronic camera of the present embodiment, the photographic image is cropped to adapt to the composition of the template. Thus, the persons as objects need to line up in a composition substantially the same as the composition of the template.

If the alignment of the persons in the photographed image is significantly deviated from the alignment of the persons in the template, the photographed image is recorded as is, without cropping. In this case, the fact that the cropping process was not conducted may be announced.

When photographing in the actual photographing mode, the image size (resolution and the number of pixels) is preferably automatically switched to the maximum image size because the cropping process is conducted as described.

The templates may be displayed on top of each other as through-the-lens images or may not be displayed. The user may be able to select the display/nondisplay.

In the above example, the user selects one from a plurality of prepared templates to conduct the cropping process to adapt to the composition in the template. However, the method of setting a template for use in not limited to this. For example, a template for use may be set by preparing templates for each of the numbers of persons and by allowing an arbitrary change in the positions and the sizes of the faces of the persons in the template (see, FIG. 19).

Although the photographic image is automatically cropped to adapt to the composition of the template in the above example, the photographic image may be automatically cropped such that the persons are shown full screen. The automatic cropping may be conducted such that the persons are fully illustrated within a preset frame.

In the series of embodiments, although examples have been described in which the present invention is applied to an electronic camera, applications of the present invention are not limited to this. The present invention can be applied to all devices equipped with a photographing function such as a cellular phone with a camera.

What is claimed is:

1. An image taking apparatus which records an image captured by an image pickup device in a recording medium in response to an image recording instruction, the image taking apparatus comprising:
    a two-step stroke shutter button operable to half-pressing and full-pressing, wherein the half-pressing of the shutter button instructs the preparation for photographing, while the full-pressing of the shutter button instructs recording of an image;
    a zooming device;
    a zooming instruction device which instructs zooming by the zooming device in a telephoto direction or a wide angle direction;
    a mode setting device which sets a person photographing mode;
    a detection device which detects a size of a face of a person captured by the image pickup device in the person photographing mode;
    a control device which controls the zooming device in response to an instruction from the zooming instruction device;
    a control device which controls the zooming device in response to the first half-pressing of the shutter button such that the size of the face of the person captured by the image pickup device becomes a preset size based on the detection result of the detection device when in the person photographing mode;
    a control device which controls the zooming device in response to an instruction from the zooming instruction device when the zooming instruction device is operated after the half-pressing of the shutter button is released.

2. The image taking apparatus according to claim 1, further comprising a setting device which sets a size of a face of a person to be photographed by the image pickup device, wherein
    the control device controls the zooming device such that the size of the face of the person captured by the image pickup device becomes the size set by the setting device.

3. The image taking apparatus according to claim 1, further comprising:
    a second detection device which detects the size of the face of the person captured by the image pickup device in the person photographing mode; and
    an estimation device which estimates the size of the face high in the photographing frequency based on the detection result of the second detection device, wherein the control device controls the zooming device such that the size of the face of the person captured by the image pickup device becomes the size estimated by the estimation device.

4. An image taking apparatus which records an image captured by an image pickup device in a recording medium in response to an image recording instruction, the image taking apparatus comprising:

a zooming device;

a zooming instruction device which instructs zooming by the zooming device in the telephoto direction or the wide direction;

a mode setting device which sets a person photographing mode;

a template recording device which is recorded with a plurality of person photographing templates with different sizes of faces;

a selection device which selects a template for use in the person photographing mode;

a detection device which detects a size of a face of a person captured by the image pickup device in the person photographing mode;

a face zooming instruction device which instructs zooming of the face of the person by the zooming device in the person photographing mode; and a control device which controls the zooming device in response to an instruction from the zooming instruction device and which controls the zooming device such that the size of the face of the person captured by the image pickup device becomes the same as a size of a face of a person in the template selected by the selection device based on the detection result of the detection device when zooming to the face of the person is instructed by the face zooming instruction device in the person photographing mode.

5. The image taking apparatus according to claim 4, comprising a two-step stroke shutter button operable to half-pressing and full-pressing, wherein the half-pressing of the shutter button instructs the zooming device to zoom a face of a person, while the full-pressing of the shutter button instructs recording of an image.

6. An image taking apparatus which records an image captured by an image pickup device in a recording medium in response to an image recording instruction, the image taking apparatus comprising:

a zooming device;

a zooming instruction device which instructs zooming by the zooming device in a telephoto direction or a wide angle direction;

a mode setting device which sets a person photographing mode;

a template recording device which is recorded with a person photographing template for use in the person photographing mode;

a setting device which sets a size of a face of a person in the template;

a detection device which detects a size of a face of a person captured by the image pickup device in the person photographing mode;

a face zooming instruction device which instructs zooming of the face of the person by the zooming device in the person photographing mode; and a control device which controls the zooming device in response to an instruction from the zooming instruction device and which controls the zooming device such that the size of the face of the person captured by the image pickup device becomes the same as the set size of the face of the person in the template based on the detection result of the detection device when zooming to the face of the person is instructed by the face zooming instruction device in the person photographing mode.

7. The image taking apparatus according to claim 6 comprising a two-step stroke shutter button operable to half-pressing and full-pressing, wherein the half-pressing of the shutter button instructs the zooming device to zoom a face of a person, while the full-pressing of the shutter button instructs recording of an image.

* * * * *